United States Patent
Miyata

(10) Patent No.: US 11,361,458 B2
(45) Date of Patent: Jun. 14, 2022

(54) THREE-DIMENSIONAL GEOMETRY MEASUREMENT APPARATUS AND THREE-DIMENSIONAL GEOMETRY MEASUREMENT METHOD

(71) Applicant: Mitutoyo Corporation, Kanagawa (JP)

(72) Inventor: Kaoru Miyata, Ibaraki (JP)

(73) Assignee: MITUTOYO CORPORATION, Kanagawa (JP)

(*) Notice: Subject to any disclaimer, the term of this patent is extended or adjusted under 35 U.S.C. 154(b) by 207 days.

(21) Appl. No.: 16/851,302

(22) Filed: Apr. 17, 2020

(65) Prior Publication Data
US 2020/0334844 A1 Oct. 22, 2020

(30) Foreign Application Priority Data

Apr. 19, 2019 (JP) .............................. JP2019-079916
Apr. 10, 2020 (JP) .............................. JP2020-071179

(51) Int. Cl.
*G06T 7/521* (2017.01)
*G06T 7/593* (2017.01)
*G06T 7/60* (2017.01)

(52) U.S. Cl.
CPC .............. *G06T 7/521* (2017.01); *G06T 7/593* (2017.01); *G06T 7/60* (2013.01); *G06T 2207/10012* (2013.01)

(58) Field of Classification Search
CPC ........... G06T 7/521; G06T 7/55; G06T 7/593; G06T 7/596; G06T 2207/10012; G06T 2207/10021; G06T 7/60; G06T 2207/10152; G06T 2207/30164; G06T 2207/30168; G06T 7/0004; G01B 11/254
See application file for complete search history.

(56) References Cited

U.S. PATENT DOCUMENTS

| | | | |
|---|---|---|---|
| 10,282,857 B1* | 5/2019 | Brailovskiy | G01B 11/2536 |
| 10,306,203 B1* | 5/2019 | Goyal | G01B 11/2513 |
| 10,317,192 B2 | 6/2019 | Miyata | |
| 2012/0056982 A1* | 3/2012 | Katz | G06T 7/521 |
| | | | 348/43 |
| 2016/0212411 A1* | 7/2016 | Lindner | H04N 13/128 |
| 2017/0241767 A1 | 8/2017 | Miyata | |
| 2017/0365065 A1* | 12/2017 | Stigwall | G06T 7/11 |

(Continued)

FOREIGN PATENT DOCUMENTS

| | | | | |
|---|---|---|---|---|
| EP | 1933167 A2 * | 6/2008 | ........... | H04N 13/254 |
| JP | 2017-146298 | 8/2017 | | |

*Primary Examiner* — Geoffrey E Summers
(74) *Attorney, Agent, or Firm* — Rankin, Hill & Clark LLP

(57) ABSTRACT

A three-dimensional geometry measurement apparatus includes: a relationship identification part that identifies a combination of a first imaging pixel and a second imaging pixel corresponding to the same projection coordinate; a determination part that determines, whether or not at least one of the first imaging pixel or the second imaging pixel is a defective pixel on the basis of a distance between a projection pixel of the projection image; and a geometry measurement part that measures a geometry of an object to be measured using the first imaging pixel or the second imaging pixel corresponding to the combination, for which the first imaging pixel and the second imaging pixel that are determined to be not the defective pixel.

12 Claims, 16 Drawing Sheets

(56) References Cited

U.S. PATENT DOCUMENTS

| | | | |
|---|---|---|---|
| 2018/0249142 A1* | 8/2018 | Hicks | G01B 11/2545 |
| 2020/0073531 A1* | 3/2020 | Romano | G06F 3/04815 |
| 2021/0183084 A1* | 6/2021 | Picard | H04N 13/254 |
| 2021/0358157 A1* | 11/2021 | Ohnishi | G01B 11/245 |

* cited by examiner

→ x

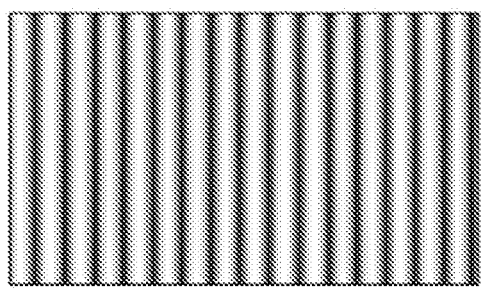
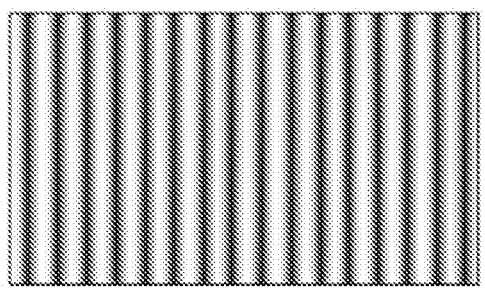
FIG. 5A  FIG. 5B
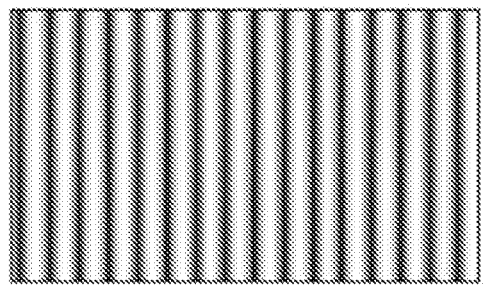
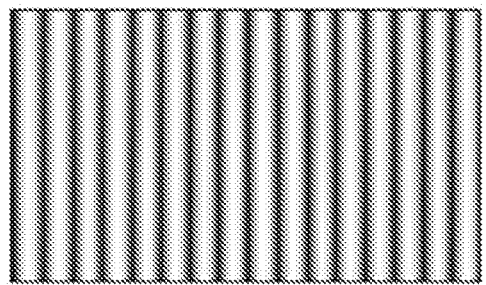
FIG. 5C  FIG. 5D

THREE-DIMENSIONAL GEOMETRY MEASUREMENT APPARATUS AND THREE-DIMENSIONAL GEOMETRY MEASUREMENT METHOD

CROSS-REFERENCE TO RELATED APPLICATIONS

The present application claims priority to Japanese Patent Application number 2019-079916, filed on Apr. 19, 2019 and Japanese Patent Application number 2020-071179, filed on Apr. 10, 2020. The contents of these applications are incorporated herein by reference in their entirety.

BACKGROUND OF THE INVENTION

The present invention relates to a three-dimensional geometry measurement apparatus and a three-dimensional geometry measurement method for measuring a geometry of an object to be measured. Methods have been proposed for measuring a geometry of an object to be measured without making any contact by projecting projection patterns and analyzing captured images obtained by imaging the object to be measured on which the projection patterns are projected (see, for example, Japanese Unexamined Patent Application Publication No 2017-146298).

When projection patterns are projected onto an object to be measured, multiple reflections may occur, which is light reflection among a plurality of surfaces of the object to be measured. When the multiple reflections occur, the captured image may include regions having luminance which is different from the luminance when there are no multiple reflections. When the number of imaging apparatuses is one, the influence of multiply reflected light needs to be identified by analyzing captured images obtained from the one imaging apparatus. For example, in the method described in Japanese Unexamined Patent Application Publication No 2017-146298, a pixel affected by multiply reflected light can be identified on the basis of luminance values of captured images. However, if the pixel affected by the multiply reflected light exhibits luminance close to the luminance of the pixel irradiated with direct reflection light, the pixel affected by the multiply reflected light might not be detected.

This invention focuses on these points, and an object of the present invention is to provide a three-dimensional (3D) geometry measurement apparatus and a three-dimensional geometry measurement method, which are capable of preventing a reduction of measurement accuracy due to multiply reflected light or the like.

BRIEF SUMMARY OF THE INVENTION

A three-dimensional geometry measurement apparatus of the first aspect of the present invention includes: a projection part that projects, onto an object to be measured, a projection image including patterns for identifying a projection coordinate; a first imaging part that generates a first captured image by imaging the projection image projected onto the object to be measured; a second imaging part that generates a second captured image by imaging the projection image projected onto the object to be measured; a first coordinate identification part that identifies the projection coordinate corresponding to a first imaging pixel of the first captured image on the basis of the patterns included in the first captured image; a second coordinate identification part that identifies the projection coordinate corresponding to a second imaging pixel of the second captured image on the basis of the patterns included in the second captured image; a line identification part that identifies a first epipolar line of the second captured image corresponding to the first imaging pixel on the basis of an arrangement of the first imaging part and the second imaging part; a relationship identification part that identifies a combination of the first imaging pixel and the second imaging pixel corresponding to the same projection coordinate as the projection coordinate corresponding to the first imaging pixel and located on the first epipolar line of the second captured image corresponding to the first imaging pixel; a determination part that determines, for each combination of the first imaging pixel and the second imaging pixel, whether or not at least one of the first imaging pixel or the second imaging pixel is a defective pixel on the basis of a distance between a projection pixel of the projection image having the projection coordinate corresponding to the first imaging pixel and a projection pixel of the projection image having the projection coordinate corresponding to the second imaging pixel; and a geometry measurement part that measures a geometry of the object to be measured using at least one of the first imaging pixel or the second imaging pixel corresponding to the combination, for which the first imaging pixel and the second imaging pixel that are determined to be not the defective pixel.

A three-dimensional geometry measurement apparatus of the second aspect of the present invention includes: a projection part that projects, onto an object to be measured, a projection image including patterns for identifying a projection coordinate; a first imaging part that generates a first captured image by imaging the projection image projected onto the object to be measured; a second imaging part that generates a second captured image by imaging the projection image projected onto the object to be measured; a first coordinate identification part that identifies the projection coordinate corresponding to the first imaging pixel of the first captured image on the basis of the patterns included in the first captured image; a second coordinate identification part that identifies the projection coordinate corresponding to the second imaging pixel of the second captured image on the basis of the patterns included in the second captured image; a line identification part that identifies an epipolar line of the projection image corresponding to the first imaging pixel on the basis of an arrangement of the first imaging part and the projection part, and identifies an epipolar line of the second captured image corresponding to the projection pixel of the projection image on the basis of an arrangement of the projection part and the second imaging part; a relationship identification part that identifies a combination of the first imaging pixel and a projection pixel of the projection image having the projection coordinate corresponding to the first imaging pixel and located on the epipolar line of the projection image corresponding to the first imaging pixel; a determination part that determines, for each combination of the first imaging pixel and the projection pixel, whether or not at least one of (i) the first imaging pixel, (ii) a main second imaging pixel which is the second imaging pixel corresponding to the same projection coordinate as the projection coordinate corresponding to the first imaging pixel, or (iii) a sub second imaging pixel which is the second imaging pixel corresponding to the projection coordinate of the projection pixel and located on the epipolar line of the second captured image corresponding to the projection coordinate is a defective pixel on the basis of a distance between the main second imaging pixel and the sub second imaging pixel and a geometry measurement part that measures a geometry of the object to be measured using at least one of the first imaging pixel, the main second imaging pixel, or the sub second imaging pixel corresponding to the combination, for which the first imaging pixel, the main second imaging pixel, and the sub second imaging pixel that are determined to be not the defective pixel.

A three-dimensional geometry measurement method according to the third aspect of the present invention includes the steps of: projecting, onto an object to be measured, a projection image including patterns for identifying a projection coordinate; generating a first captured image by imaging the projection image projected onto the object to be measured with a first imaging part; generating a second captured image by imaging the projection image projected onto the object to be measured with a second imaging part; identifying the projection coordinate corresponding to a first imaging pixel of the first captured image on the basis of the patterns included in the first captured image; identifying the projection coordinate corresponding to a second imaging pixel of the second captured image on the basis of the patterns included in the second captured image; identifying an epipolar line of the second captured image corresponding to the first imaging pixel on the basis of an arrangement of the first imaging part and the second imaging part; identifying a combination of the first imaging pixel and the second imaging pixel corresponding to the same projection coordinate as the projection coordinate corresponding to the first imaging pixel and located on the epipolar line of the second captured image corresponding to the first imaging pixel; determining, for each combination of the first imaging pixel and the second imaging pixel, whether or not at least one of the first imaging pixel or the second imaging pixel is a defective pixel, on the basis of a distance between (i) a projection pixel of the projection image having the projection coordinate corresponding to the first imaging pixel and (ii) a projection pixel of the projection image having the projection coordinate corresponding to the second imaging pixel; and measuring a geometry of the object to be measured using at least one of the first imaging pixel corresponding to the combination of the first imaging pixel or the second imaging pixel that are determined to be not the defective pixel.

BRIEF DESCRIPTION OF THE DRAWINGS

FIGS. 5A to 5D respectively show examples of gradation stripe patterns having sinusoidal luminance distributions.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

First Embodiment

[Outline of a Three-Dimensional (3D) Geometry Measurement Apparatus 100]

Figure 1A:
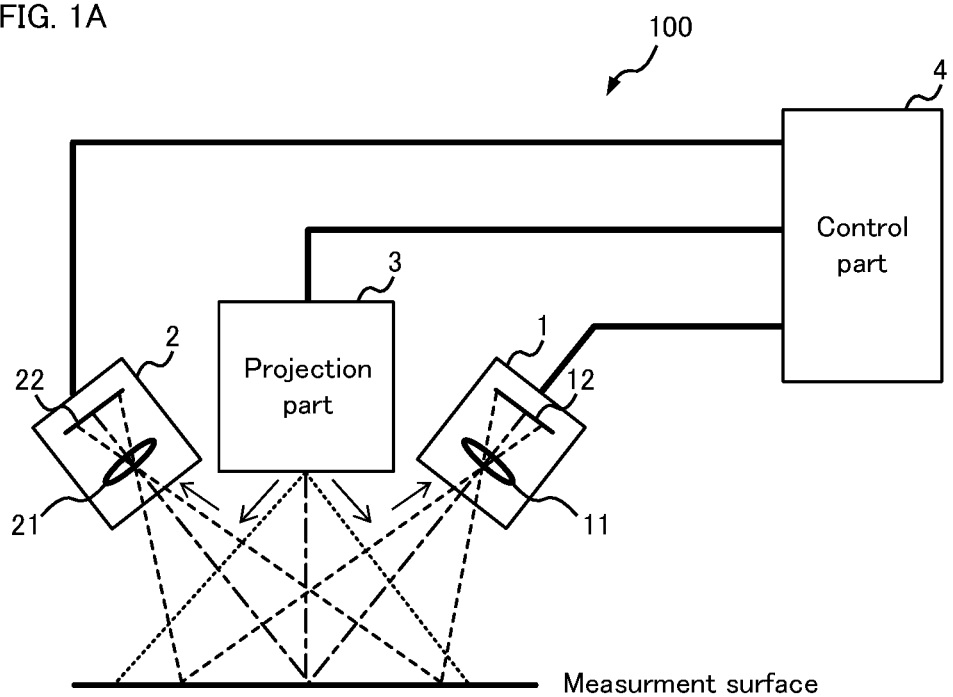
FIGS. 1A to 1C illustrate an outline of a three-dimensional (3D) geometry measurement apparatus according to the first embodiment.
Figure 1B:
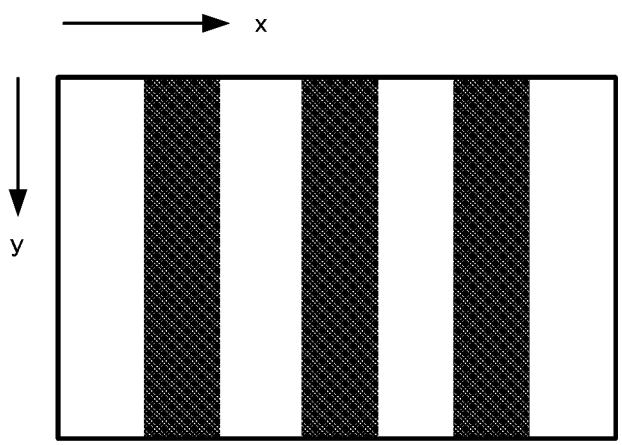
Figure 1C:
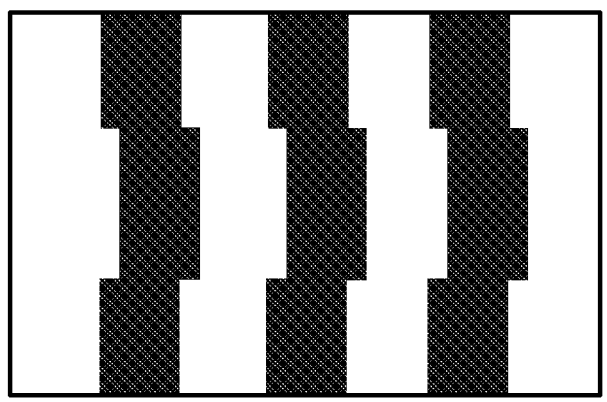

FIGS. 1A to 1C illustrate the outline of a 3D geometry measurement apparatus 100 according to the first embodiment. FIG. 1A shows a configuration of the 3D geometry measurement apparatus 100. The 3D geometry measurement apparatus 100 projects a projection image onto a measurement surface of the object to be measured. In the 3D geometry measurement apparatus 100, the object to be measured, on which a projection part 3 projects the projection image, is imaged with two imaging parts, i.e., a first imaging part 1 and a second imaging part 2. The 3D geometry measurement apparatus 100 optically measures a 3D geometry of the object to be measured by analyzing the captured image generated by the 3D geometry measurement apparatus 100.

The projection part 3 is a projection apparatus having a light source such as light emitting diodes or lasers. The projection part 3 projects a projection image, including patterns for identifying a projection coordinate, onto the measurement surface of the object to be measured. The projection coordinates indicate positions of the projection pixels composing the projection image which the projection part 3 projects. The projection coordinates may be a one-dimensional coordinate indicating either a vertical or horizontal position of the projection image, or two-dimensional coordinates indicating both the vertical and horizontal positions of the projection image. The patterns are, for example, stripe patterns.

The first imaging part 1 includes a lens 11 and an imaging element 12. The first imaging part 1 generates a first captured image by imaging the projection image projected onto the object to be measured while the projection part 3 is projecting the projection image onto the object to be measured. The first imaging part 1 is placed in such a manner that the optical axis of the first imaging part 1 forms a predetermined first angle with the optical axis of the projection part 3. The first imaging part 1 is placed in such a manner that the optical axis of the first imaging part 1 forms a predetermined second angle with the optical axis of the second imaging part 2.

The second imaging part 2 has a lens 21 and an imaging element 22. The second imaging part 2 generates a second captured image by imaging the projection image projected onto the object to be measured while the projection part 3 is projecting the projection image onto the object to be measured. The second imaging part 2 is placed in such a manner that the optical axis of the second imaging part 2 forms a predetermined third angle with the optical axis of the projection part 3. The optical axis of the second imaging part 2 may be in the same plane as the optical axis of the first imaging part 1 and the optical axis of the projection part 3, but is not limited to this. A control part 4 measures the geometry of the object to be measured based on a plurality of captured images generated by the first imaging part 1 and the second imaging part 2. The control part 4 is implemented by a computer, for example.

FIGS. 1B and 1C each show an example of a captured image generated by the first imaging part 1 while the projection part 3 projects the projection images onto the object to be measured. As shown in FIGS. 1 B and 1C, the projection part 3 projects the projection images including binary stripe patterns onto the object to be measured. The binary stripe patterns are composed of light projection regions, onto which light is projected, and non-projection regions, onto which light is not projected. FIG. 1B shows the captured image generated by the first imaging part 1 and the second imaging part 2 when the projection part 3 projects the projection images including the binary stripe patterns onto an even measurement surface. The white regions represent the light projection regions, and the black regions represent the non-projection regions. When the measurement surface has no irregularities, the binary stripe patterns of the captured image generated by the first imaging part 1 and the second imaging part 2 approximately match the binary stripe patterns of the projection image.

FIG. 1C shows the captured image generated by the first imaging part 1 or the second imaging part 2 when the projection part 3 projects the patterns of binary stripes onto a measurement surface having convex portions. As shown in the captured image of FIG. 1C, the image of a part of binary stripe patterns is deformed. In the captured image, the image of the binary stripe patterns is deformed by an amount according to the height of the convex portions. Therefore, the 3D geometry measurement apparatus 100 can measure the geometry of the object to be measured by identifying the height of each location of the convex portion on the basis of the amount of deformation in the binary stripe pattern image in the captured image.

The 3D geometry measurement apparatus 100 measures the 3D geometry of the object to be measured by analyzing the stripe patterns projected onto the object to be measured. However, when the surface of the object to be measured is glossy, there is a problem that measurement accuracy is reduced due to the multiple reflections caused by projected light from the projection part 3 being multiply reflected. Therefore, the 3D geometry measurement apparatus 100 images the object to be measured using the first imaging part 1 and the second imaging part 2 with the patterns projected onto the object to be measured, and analyzes two captured images respectively generated by the first imaging part 1 and the second imaging part 2 to determine whether or not an imaging pixel included in the captured image is a defective pixel affected by multiply reflected light or the like. The 3D geometry measurement apparatus 100 measures the 3D geometry of the object to be measured by analyzing the imaging pixels excluding defective pixels.

As will be described in detail below, the 3D geometry measurement apparatus 100 selects a combination of a first imaging pixel included in the first captured image generated by the first imaging part 1 and a second imaging pixel included in the second captured image generated by the second imaging part 2. The 3D geometry measurement apparatus 100 can determine whether at least one of the first imaging pixel or the second imaging pixel is the defective pixel affected by multiply reflected light or the like, by determining whether the first imaging pixel and the second imaging pixel in the selected combination corresponds to approximately the same projection pixel of the projection image. Therefore, the 3D geometry measurement apparatus 100 can prevent the reduction of measurement accuracy of the geometry of the object to be measured due to multiply reflected light or the like.

[Directions in which Stripes Extend]

Figure 2A:
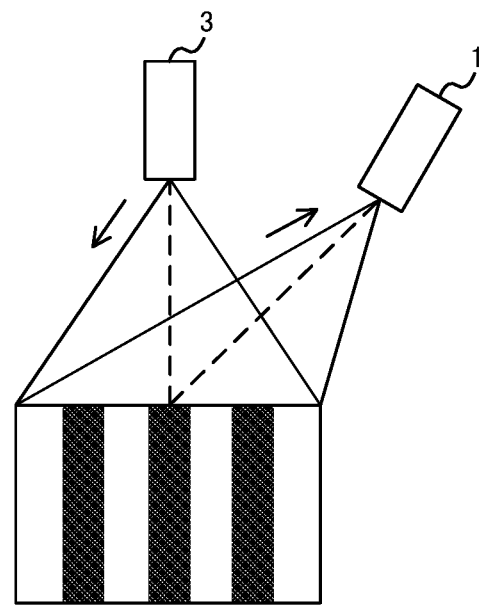
FIGS. 2A and 2B each show a projection image which a projection part projects onto an object to be measured.
Figure 2B:
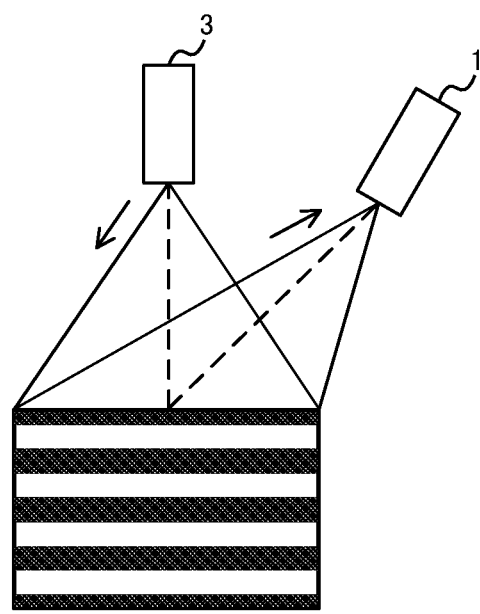

FIGS. 2 A and 2B each show the projection image which the projection part 3 projects onto the object to be measured. FIG. 2A shows an example of binary stripe patterns extending in the first direction, and FIG. 2B shows an example of binary stripe patterns extending in the second direction. As shown in FIG. 2A, the projection part 3 projects the binary stripe patterns extending in the first direction (this may be referred to as a vertical direction below). The first direction is a direction orthogonal to a plane including the optical axis of the projection part 3 and the optical axis of the first imaging part 1.

As shown in FIG. 2B, the projection part 3 projects binary stripe patterns extending in the second direction (this may be referred to as a horizontal direction below). The second direction is a direction parallel to a plane including the optical axis of the projection part 3 and the optical axis of the first imaging part 1. The vertical direction may be a direction along one direction of the projection image, and the horizontal direction may be a direction orthogonal to the vertical direction. The first imaging part 1, the second imaging part 2, and the projection part 3 may be placed in such a manner that their optical axes pass through any point on the same straight line on a stage for placing the object to be measured, but are not limited to this.

When the stripe patterns are projected onto the object to be measured, the stripe patterns deviate in the width direction in accordance with the 3D geometry of the object to be measured, as shown in FIG. 1C. Also, the width of the stripe patterns fluctuates in accordance with the 3D geometry of the object to be measured. In the first captured image with the stripe patterns extending in the first direction, the direction that causes the deviation of an orientation of the optical axes of the projection part 3 and the first imaging part 1 matches the direction in which the deviation in the width direction of the stripe patterns and the like occurred. That is, (i) a direction of an image of a line segment generated by projecting a line segment connecting the projection part 3 and the first imaging part 1 onto a plane where the object to be measured is placed and (ii) the direction in which the deviation in the width direction of the stripe patterns and the like occurred match one another. Therefore, in the captured image with the stripe patterns extending in the first direction, the sensitivity to detect the deviation of the stripe patterns in the width direction and the like is high. For this reason, resolution is improved in the measurement of the 3D geometry of the object to be measured.

On the other hand, in the captured image with the stripe patterns extending in the second direction, (i) the direction that causes the deviation of the orientation of the optical axes of the projection part 3 and the first imaging part 1 is orthogonal to (ii) the direction in which the deviation or the like in the width direction of the stripe patterns occurred. That is, the direction of an image for the line segment generated by projecting the line segment connecting the projection part 3 and the first imaging part 1 onto the plane where the object to be measured is placed and the direction in which the deviation in the width direction of the stripe patterns and the like occurred are orthogonal. Therefore, the measurement resolution of the captured image with the stripe patterns extending in the second direction is lowered in the measurement of the 3D geometry of the object to be measured, as compared with the captured image with the stripe patterns extending in the first direction.

[Configuration of the 3D Geometry Measurement Apparatus]

Figure 3:
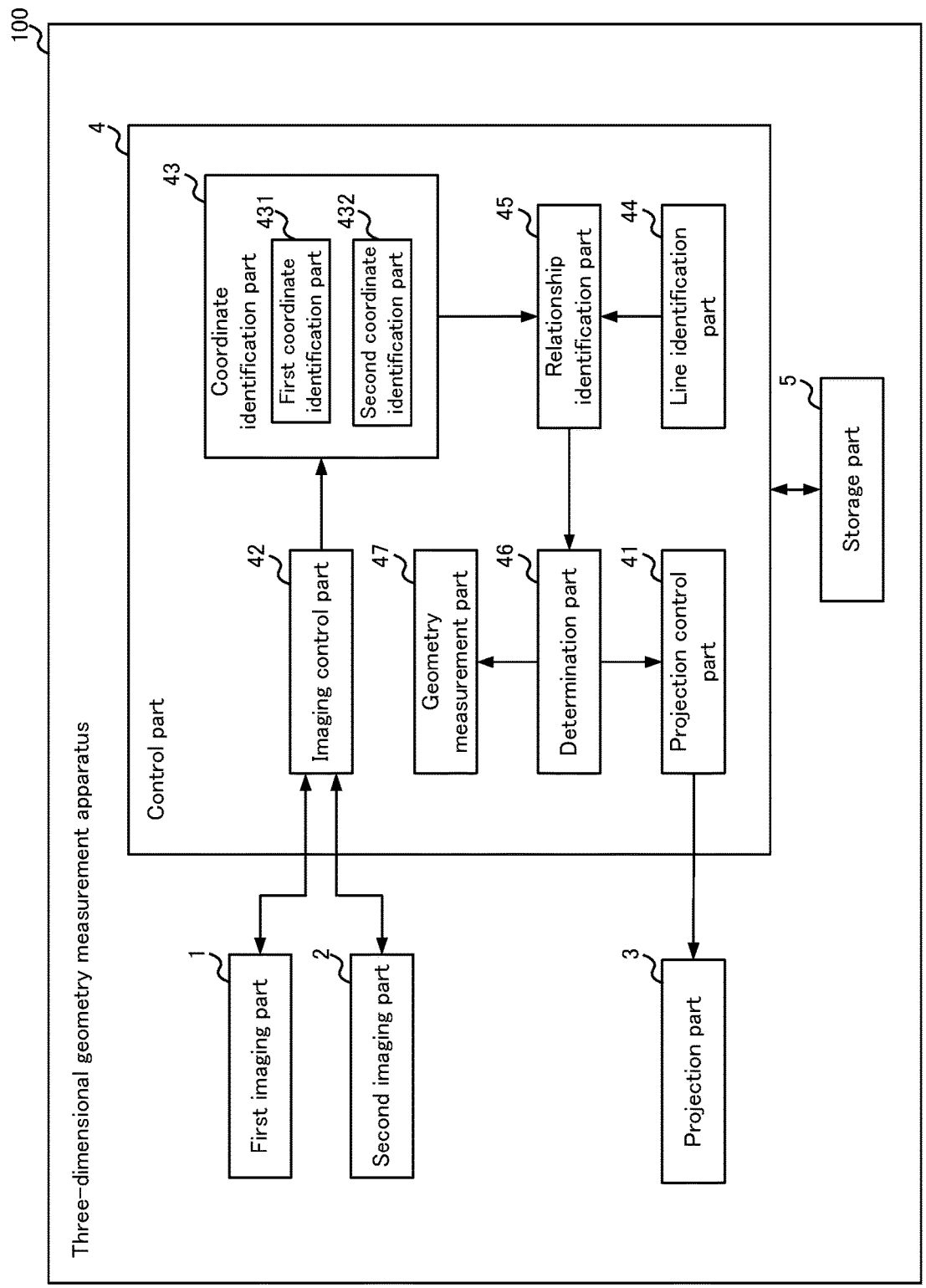
FIG. 3 shows a configuration of the 3D geometry measurement apparatus.

FIG. 3 shows a configuration of the 3D geometry measurement apparatus 100. The 3D geometry measurement apparatus 100 includes the first imaging part 1, the second imaging part 2, the projection part 3, a storage part 5 and the control part 4. The storage part 5 includes a storage medium including a hard disk, a read only memory (ROM), a random access memory (RAM), and the like. The storage part 5 stores programs to be executed by the control part 4. The control part 4 is, for example, a central processing unit (CPU) and functions as a projection control part 41, an imaging control part 42, a coordinate identification part 43, a line identification part 44, a relationship identification part 45, a determination part 46, and a geometry measurement part 47 by executing the programs stored in the storage part 5.

The projection control part 41 generates control signals for projecting the projection images including patterns for identifying projection coordinates onto the object to be measured, and inputs the generated control signals to the projection part 3. For example, the projection control part 41 projects a plurality of projection images including stripe patterns extending in the same direction onto the object to be measured by the projection part 3. The projection control part 41 may project, onto the object to be measured, a plurality of projection images, in which the stripes included in the patterns extend in directions different from each other. Hereinafter, types of stripe patterns which the projection control part 41 projects will be explained by referring to FIGS. 4A to 4F and FIGS. 5A to 5D.

[Types of Stripe Patterns]

The projection control part 41 projects projection images including binary stripe patterns onto the object to be measured. FIGS. 4A to 4F respectively show examples of types of projection images which the projection control part 41 projects. In FIGS. 4A to 4F, the black regions represent regions where the projection part 3 does not project light, and the white regions represent regions where the projection part 3 projects light.

Figure 4A:
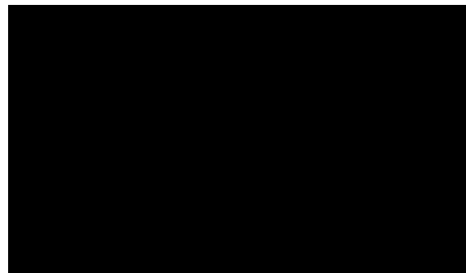
FIGS. 4A to 4F respectively show examples of types of projection images which a projection control part projects.
Figure 4B:
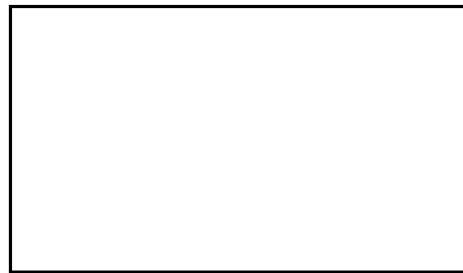
Figure 4C:
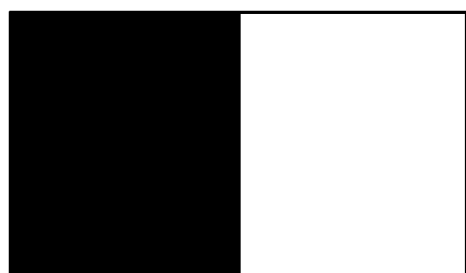
Figure 4D:
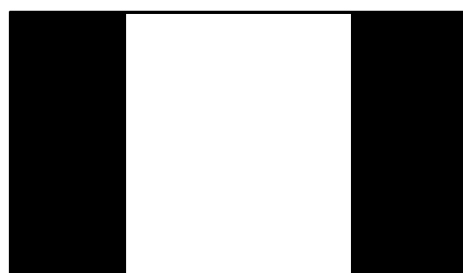
Figure 4E:
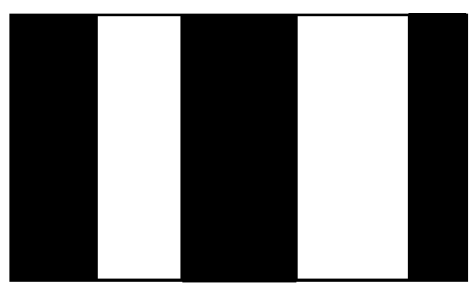

FIG. 4A shows a standard projection pattern in which light is not projected onto any part of the object to be measured (i.e., an all-black pattern). FIG. 4B shows a standard projection pattern in which light is projected onto the entire object to be measured (i.e., an all-white pattern). FIGS. 4C to 4F show binary stripe patterns, which are composed of a light-projected region and a no-projection region and in which the stripes that have a different width for each projection image are arranged in the same direction. The stripe patterns shown in FIGS. 4A to 4F correspond to Gray codes and are used for identifying projection coordinates indicating positions of projection pixels in the projection image corresponding to imaging pixels in the captured image. Details will be described below.

The projection control part 41 projects projection images including gradation stripe patterns having sinusoidal luminance distributions onto the object to be measured. FIGS. 5A to 5D respectively show examples of gradation stripe patterns having sinusoidal luminance distributions. While the binary stripe patterns shown in FIGS. 4C to 4F are binary images composed of the black regions and the white regions, in the gradation stripe patterns shown in FIGS. 5A to 5D, shading changes in a sinusoidal manner from the white region to the black region along the width direction of the stripes. Intervals between the stripes in the gradation stripe patterns of FIGS. 5A to 5D are constant, and spatial frequency of the stripes in the gradation stripe patterns is, for example, four times the spatial frequency of the binary stripe patterns of FIG. 4F.

Figure 4F:
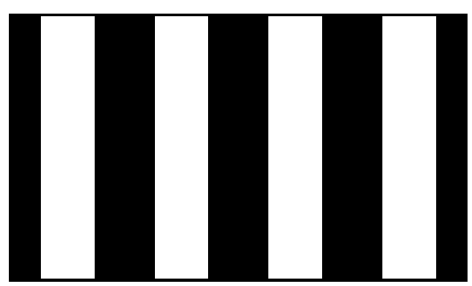

The gradation stripe patterns of FIGS. 5A to 5D are different from each other in the point that the phases of the sine waves indicating the luminance distribution differ by 90 degrees from each other, and their luminance distributions are otherwise the same. In the present embodiment, the projection control part 41 projects a total of ten pieces of the projection images: two standard patterns shown in FIGS. 4A and 4B, four binary stripe patterns shown in FIGS. 4C to 4F, and four gradation stripe patterns shown in FIGS. 5A to 5D. The gradation stripe patterns shown in FIGS. 5A to 5D, together with the stripe patterns shown in FIGS. 4A and 4F, are used for identifying the projection coordinates. The projection control part 41 may project, onto the object to be measured, a plurality of projection images including patterns, in which the stripe width differs, depending on the directions in which the stripes extend.

Figure 6:
FIG. 6 shows examples of Gray codes corresponding to binary stripe patterns shown in FIGS. 4C to 4F.

As described above, the binary stripe patterns shown in FIGS. 4C to 4F correspond to Gray codes. In FIG. 6, examples of binary stripe patterns shown in FIGS. 4C to 4F are shown. By associating 0s in the Gray codes with the no-projection regions and is with the light-projection regions, the binary stripe patterns shown in FIGS. 4C to 4F are generated.

Each position in the x-direction in FIGS. 4A to 4F and FIG. 6 is represented by a code value, which is the combination of the numbers 0 or 1 at the respective positions in the Gray codes. Position 0 in FIG. 6 corresponds to the code value of "0000," Position 1 corresponds to the code value of "0001," and Position 15 corresponds to the code value of "1000."

The imaging control part 42 of FIG. 3 generates a first captured image, in which the projection image projected on the object to be measured is imaged by the first imaging part 1. The imaging control part 42 generates a second captured image, in which the projection image projected on the object to be measured is imaged by the second imaging part 2.

[Identifying a Projection Coordinate]

The coordinate identification part 43 includes a first coordinate identification part 431 and a second coordinate identification part 432. The first coordinate identification part 431 identifies a projection coordinate corresponding to the first imaging pixel of the first captured image on the basis of the patterns included in the first captured image. The first coordinate identification part 431 analyzes a change in shading in the patterns included in the first captured image, thereby identifying the projection coordinate indicating a position of the projection pixel corresponding to the imaging pixel included in the first captured image.

The first coordinate identification part 431 calculates, for each pixel, an average value of (i) a luminance value when the all-black pattern shown in FIG. 4A is projected and (ii) a luminance value when the all-white pattern shown in FIG. 4B is projected, as a median value. Similarly, regarding the captured images being imaged while the binary stripe patterns of FIGS. 4C to 4F are projected onto object to be measured, the first coordinate identification part 431 identifies the code values of respective imaging pixels by comparing the luminance values of respective imaging pixels in four captured images with corresponding median values. By identifying the code values, the first coordinate identification part 431 can identify which binary stripe is reflected at each imaging pixel position among the binary stripe patterns respectively projected toward different positions. The first coordinate identification part 431 identifies at which position, from Position 0 to Position 15 shown in FIG. 6, each imaging pixel included in the captured image is included.

Further, the first coordinate identification part 431 identifies, as the projection coordinates, the phases of the sine waves corresponding to the imaging pixels in the captured image generated when the gradation stripe patterns having sinusoidal luminance distributions are projected onto the object to be measured. Because the gradation stripe patterns of the projection image have periodicity, a plurality of projection pixels have the same projection coordinates in the projection image. Hereinafter, the projection coordinates having periodicity in the projection image are also referred to as relative projection coordinates. On the other hand, projection coordinates uniquely defined in the projection image are referred to as absolute projection coordinates.

Figure 7:
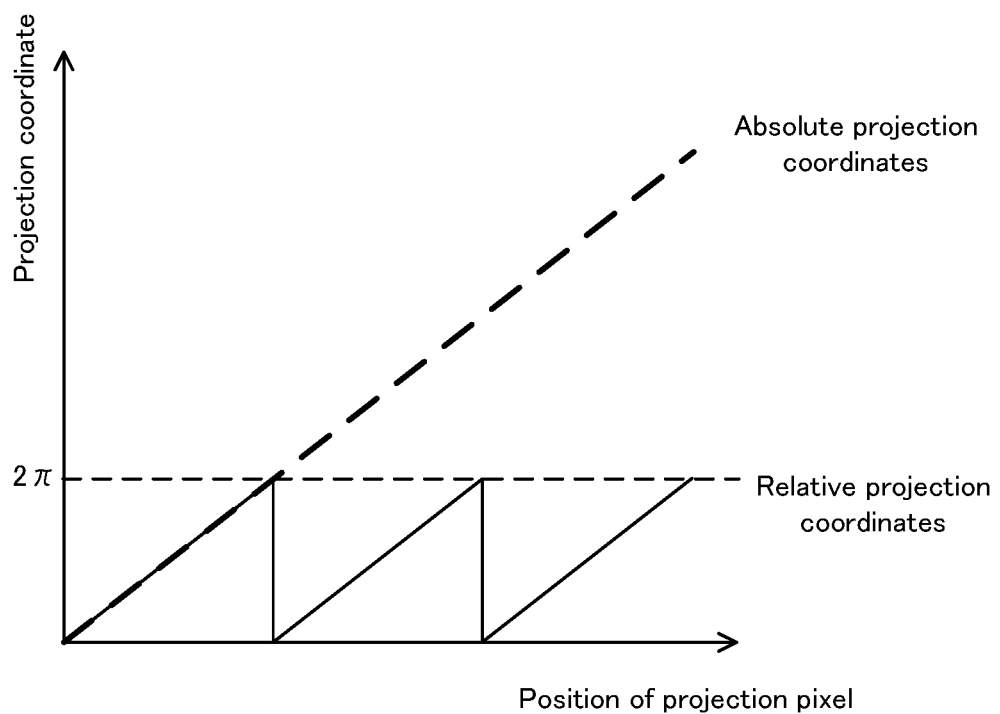
FIG. 7 shows a relationship between absolute projection coordinates and relative projection coordinates.

FIG. 7 shows a relationship between the absolute projection coordinates and the relative projection coordinates. The vertical axis of FIG. 7 indicates projection coordinates. The horizontal axis of FIG. 7 indicates positions of the projection pixels in the width direction of the stripes contained in the projection image. The width direction is a direction orthogonal to the direction in which the stripes extend. As the solid line of FIG. 7 shows, the relative projection coordinates have periodicity. The relative projection coordinates show the same value for each cycle of the repetition of the gradation stripe patterns having sinusoidal luminance distributions. On the other hand, as the broken line of FIG. 7 shows, the absolute projection coordinates are uniquely defined in the projection image.

The first coordinate identification part 431 identifies the relative projection coordinate corresponding to the imaging pixel by analyzing shading of the gradation stripe patterns. The first coordinate identification part 431 identifies, on the basis of the Gray codes indicated by the binary stripe patterns, an absolute projection coordinate corresponding to the imaging pixel by identifying which position from Position 0 to Position 15 the imaging pixel corresponds to. Where k(=1, 2) is an index representing the vertical and horizontal directions, the vertical and horizontal components $(i_p, j_p)$ of the projection pixel included in the projection image are expressed as follows for each imaging pixel (i, j).

$$(i_p, j_p) = \left(\frac{p_1 I_{AP,1}(i, j)}{2\pi}, \frac{p_2 I_{AP,2}(i, j)}{2\pi}\right) \quad \text{[Equation 1]}$$

$I_{AP,k}(i,j)$, where k=1,2 is the absolute projection coordinate in the captured image being imaged while the stripe patterns in the vertical direction and the stripe patterns in the horizontal direction having sinusoidal luminance distributions are projected. $p_k$ is the number of pixels corresponding to one cycle of repetition of stripes of the projection image.

A correspondence between (i) the projection pixels that irradiate light to a measurement point of the object to be measured and (ii) the imaging pixels that receive light from the measurement point is constant even if the patterns of the projection image projected onto the object to be measured are changed. However, when multiple reflections or the like occur, the first coordinate identification part 431 may identify a different projection coordinate as the projection coordinate corresponding to the same imaging pixel because the intensity or the like of the multiply reflected light changes when the projection image, which the projection control part 41 projects, is changed.

The first coordinate identification part 431 checks whether the projection coordinate corresponding to the imaging pixel changes or not when the projection control part 41 has changed the projection image. When the projection control part 41 projects a plurality of projection images, in which stripes extend in different directions, the first coordinate identification part 431 identifies the projection coordinate corresponding to the first imaging pixel for each of the projection images, in which stripes extend in different directions.

In the same manner as the first coordinate identification part 431, the second coordinate identification part 432 identifies a projection coordinate corresponding to the second imaging pixel of the second captured image on the basis of the patterns included in the second captured image. When the projection control part 41 projects the plurality of projection images in which stripes extend in different directions, the second coordinate identification part 432 identifies a projection coordinate corresponding to the second imaging pixel for each of the projection images in which stripes extend in different directions.

[Identifying Epipolar Lines]

Figure 8:
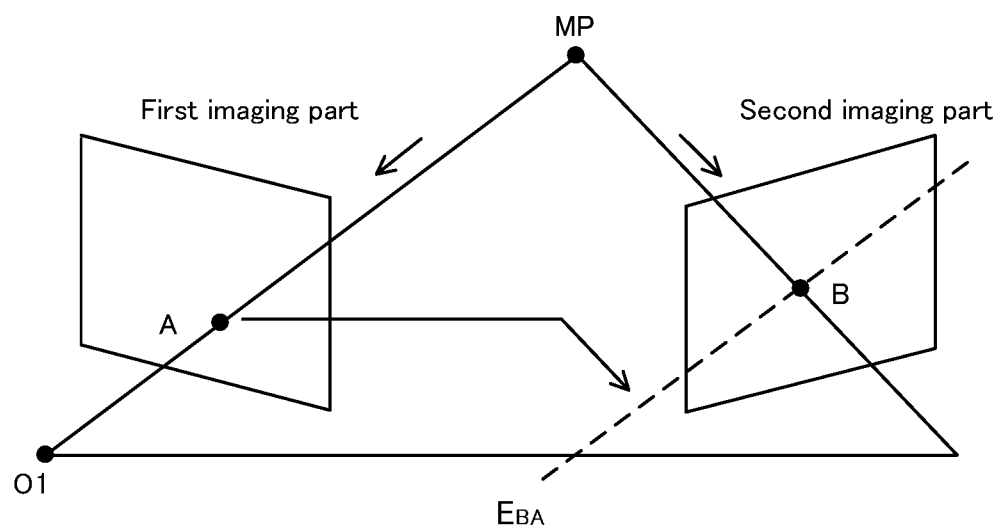
FIG. 8 illustrates an example where a first imaging part and a second imaging part are used to image the object to be measured.

The line identification part 44 identifies a first epipolar line of the second captured image corresponding to the first imaging pixel on the basis of the arrangement of the first imaging part 1 and the second imaging part 2. FIG. 8 illustrates an example where the first imaging part 1 and the second imaging part 2 are used to image the object to be measured.

A first imaging pixel A in an image plane of the first imaging part 1 on the left side of FIG. 8 corresponding to a measurement point MP and a second imaging pixel B in an image plane of the second imaging part 2 on the right side corresponding to the same measurement point MP have a fixed relationship based on the arrangement of two imaging parts. An optical center of the first imaging part 1 is denoted by O1, and a straight line extending from the optical center O1 of the first imaging part 1 to the measurement point MP through the first imaging pixel A is a first epipolar line $E_{BA}$, which is a straight line projected onto the image plane of the second imaging part 2 on the right side.

A second imaging pixel B, due to the nature of a geometrical restriction, is at any position on the first epipolar line $E_{BA}$. The line identification part 44 reads arrangement information indicating the arrangement of the first imaging part 1 and the second imaging part 2 stored in the storage part 5 in advance, and identifies the first epipolar line $E_{BA}$ of the second captured image corresponding to the first imaging pixel A on the basis of the read arrangement information. The line identification part 44 stores the identified first epipolar line $E_{BA}$ in the storage part 5 in association with the first imaging pixel A. For example, the line identification part 44 associates coordinate values of the vertical components and horizontal components of respective second imaging pixels on the first epipolar line $E_{BA}$ with the first imaging pixel A and stores them in the storage part 5.

Figure 9:
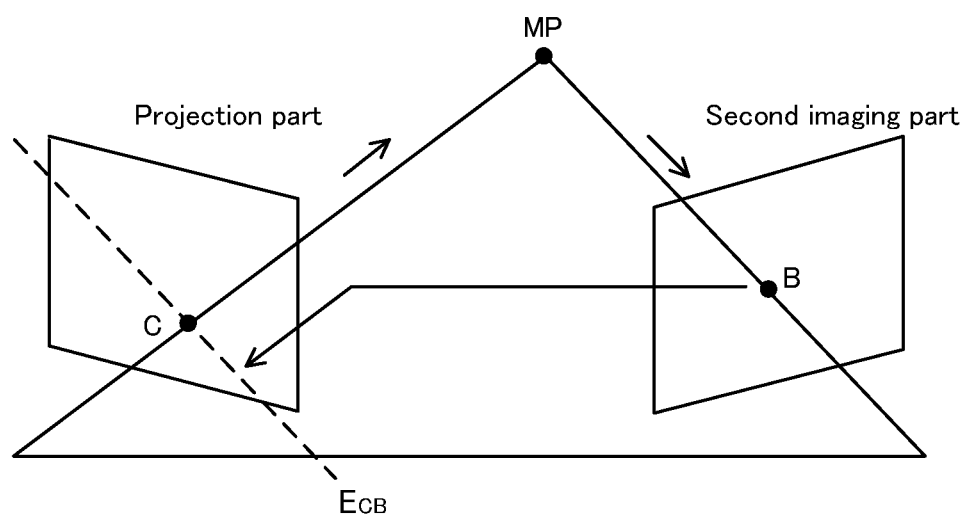
FIG. 9 shows an example of a second epipolar line of a projection image corresponding to a second captured image.

The line identification part 44 identifies a second epipolar line of the projection image corresponding to the second imaging pixel on the basis of the arrangement of the second imaging part 2 and the projection part 3. FIG. 9 shows an example of a second epipolar line $E_{CB}$ of the projection image corresponding to the second captured image. In FIG. 9, if projection part 3 is regarded as the imaging part, in which the light beam travels in the opposite direction, it can be said that the second imaging pixel B of the second imaging part 2 and the projection pixel C of the projection part 3 have the same correspondence as in FIG. 8. The line identification part 44 reads arrangement information indicating the arrangement of the second imaging part 2 and the projection part 3 stored in the storage part 5 in advance, and identifies the second epipolar line $E_{CB}$ of the projection image corresponding to the second imaging pixel B on the basis of the read arrangement information.

If a light beam emitted from the projection pixel C is reflected only once at the measurement point MP of the object to be measured and received on the second imaging pixel B, the projection pixel C is at any position on the second epipolar line $E_{CB}$ due to the nature of a geometrical restriction. The line identification part 44 stores the identified second epipolar line $E_{CB}$ in the storage part 5 in association with the second imaging pixel B. For example, the line identification part 44 associates coordinate values of the vertical components and horizontal components of the respective projection pixels on the second epipolar line $E_{CB}$ with the second imaging pixel B and stores them in the storage part 5.

The line identification part 44 identifies a third epipolar line (not shown) of the projection image corresponding to the first imaging pixel on the basis of the arrangement of the first imaging part 1 and the projection part 3. The first imaging pixel A of the first imaging part 1 and the projection pixel C of the projection part 3 have the same correspondence as in FIG. 8. The line identification part 44 reads arrangement information indicating the arrangement of the first imaging part 1 and the projection part 3 stored in the storage part 5 in advance, and identifies the third epipolar line of the projection image corresponding to the first imaging pixel A on the basis of the read arrangement information.

When a light beam emitted by a light emitting element of the projection pixel C is reflected once by the object to be measured and received by a light receiving element of the first imaging pixel A, the projection pixel C, due to the nature of a geometrical restriction, is at any position on the third epipolar line. The line identification part 44 stores the identified third epipolar line in the storage part 5 in association with the first imaging pixel A. For example, the line identification part 44 associates coordinate values of the vertical components and horizontal components of the respective projection pixels on the third epipolar line with the first imaging pixel A and stores them in the storage part 5.

[Identifying a Combination of the First Imaging Pixel and the Second Imaging Pixel]

The relationship identification part 45 identifies a combination of the first imaging pixel and the second imaging pixel corresponding to the same measurement point MP of the object to be measured. The relationship identification part 45 acquires the first epipolar line $E_{BA}$ of the second captured image associated with the first imaging pixel A from the storage part 5.

When it is assumed that the absolute projection coordinate corresponding to the first imaging pixel A is $I_{1AP}(i_A, j_A)$, a second imaging pixel corresponding to the same absolute projection coordinate $I_{1AP}(i_A, j_A)$ as the first imaging pixel A exists on the first epipolar line $E_{BA}$. The second imaging pixel corresponds to the first imaging pixel A and the same measurement point MP of the object to be measured in the second captured image. As shown in FIG. 8, the relationship identification part 45 selects the second imaging pixel B which is located on the first epipolar line $E_{BA}$ in the second captured image and corresponds to the same absolute projection coordinate $I_{1AP}(i_A, j_A)$ as the first imaging pixel A. The relationship identification part 45 identifies, as the combination corresponding to the same measurement point MP, the combination of the first imaging pixel A and the selected second imaging pixel B.

Similarly, among a plurality of first imaging pixels included in the first captured image and a plurality of second imaging pixels included in the second captured image, the relationship identification part 45 identifies a plurality of combinations of the first imaging pixel and the second imaging pixel corresponding to a common measurement point of the object to be measured. The relationship identification part 45 outputs the identified combinations to the determination part 46.

[Multiple Reflections]

Figure 10A:
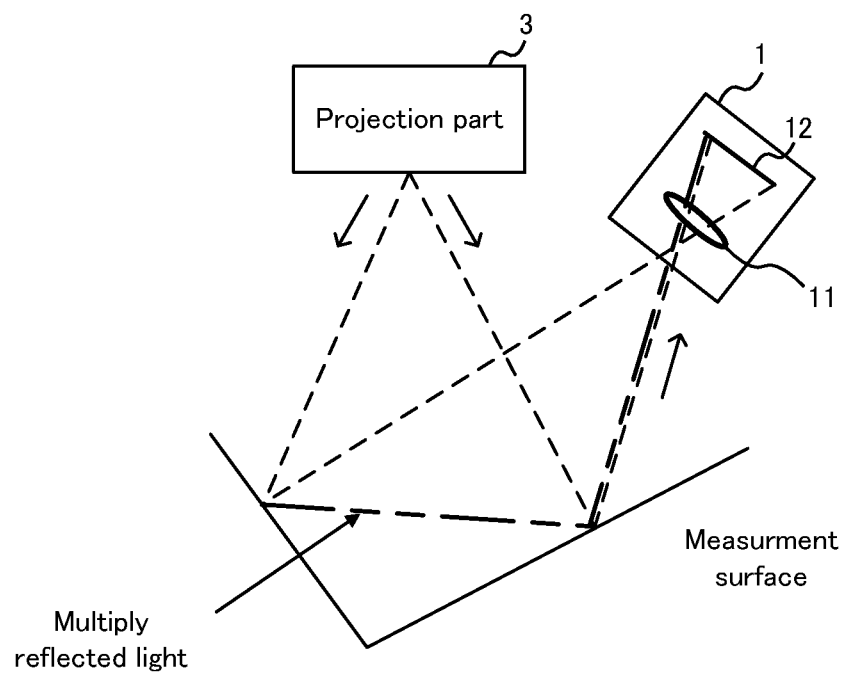
FIGS. 10A and 10B each illustrate multiple reflections.
Figure 10B:
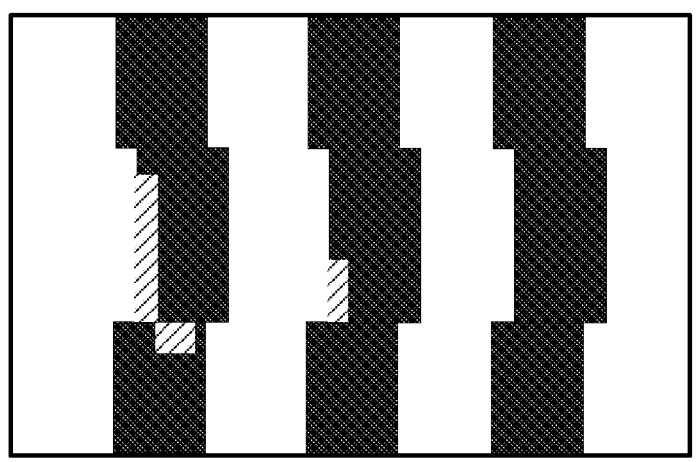

The determination part 46 determines whether or not at least one of the first imaging pixel or the second imaging pixel is the defective pixel due to multiple reflections or the like. FIGS. 10A and 10B each illustrate multiple reflections. When the object to be measured is glossy and has a complicated shape, light emitted by the projection part 3 may enter the first imaging part 1 or the second imaging part 2 after being repeatedly reflected multiple times on the surface of the object to be measured. In this case, as shown in FIG. 10A, the light emitted by the projection part 3 enters one imaging pixel of the imaging element 12 of the first imaging part 1 via two or more paths.

In the case of FIG. 10A, the light entering the imaging element 12 includes (i) direct reflection light, which is the light emitted by the projection part 3 and which directly enters the first imaging part 1 or the second imaging part 2 after being diffused and reflected on the surface to be measured, and (ii) multiply reflected light, which is the light that is emitted by the projection part 3 and enters the first imaging part 1 or the second imaging part 2 after being subjected to multiple reflections. As a result, in the captured image imaged by the first imaging part 1 or the second imaging part 2, a pixel having a luminance value corresponding to black when there is no multiply reflected light may have a luminance value corresponding to white. In particular, the multiple reflections are likely to occur when the object to be measured contains metal or the like which is likely to cause random reflection.

FIG. 10B illustrates an example of the captured image affected by the multiple reflections. FIG. 10B corresponds to FIG. 1C, but due to the influence of multiply reflected light, the shaded portions have luminance which is different from the luminance in FIG. 1C. Also, due to the influence of multiply reflected light, distortion or the like may occur in the sinusoidal waveform exhibited by the luminance distributions of the gradation stripe patterns.

[Determining Defective Pixels]

For each of the combinations of the first imaging pixel and the second imaging pixel identified by the relationship identification part 45, the determination part 46 respectively identifies (i) a projection pixel of the projection image having the projection coordinate corresponding to the first imaging pixel and (ii) a projection pixel of the projection image having the projection coordinate corresponding to the second imaging pixel. The determination part 46 determines whether or not at least one of the first imaging pixel or the second imaging pixel is a defective pixel on the basis of a distance between two identified projection pixels.

When determining whether at least one of the first imaging pixel or the second imaging pixel is a defective pixel, the determination part 46 uses different methods for (i) a case where the projection control part 41 projects only the plurality of projection images including the stripe patterns extending in the same direction and (ii) a case where the projection control part 41 projects the plurality of projection images including stripe patterns extending in different directions, as described below.

[Measurement by Single-Directional Stripes]

Figure 11:
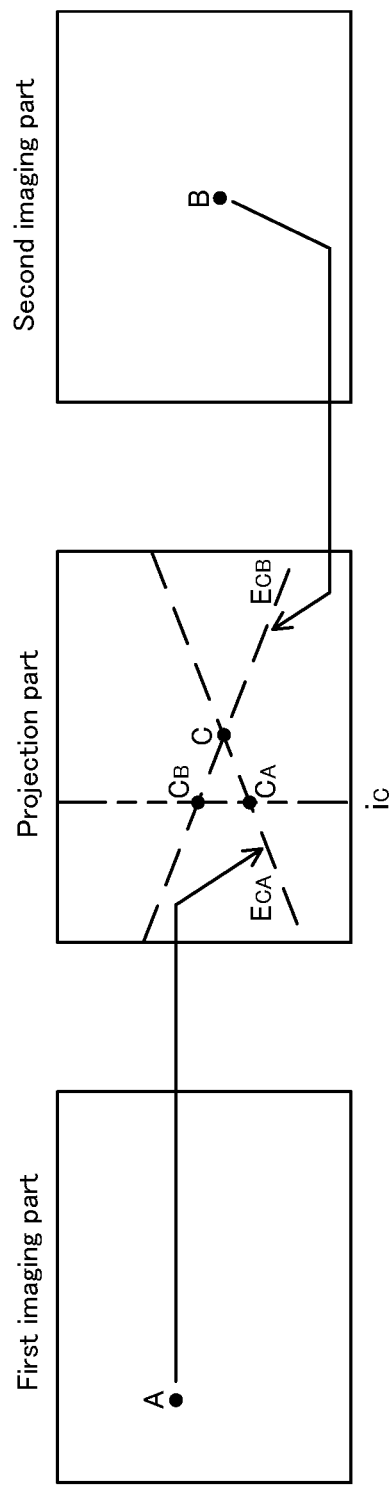
FIG. 11 shows a method in which a determination part determines a defective pixel when a projection control part projects only a plurality of projection images that include stripe patterns extending in the same direction.

FIG. 11 shows a method in which the determination part 46 determines a defective pixel when the projection control part 41 projects only the plurality of projection images that include stripe patterns extending in the same direction. The determination part 46 identifies a projection pixel having a projection coordinate ($i_C$, $j_{CA1}$) corresponding to the first imaging pixel A for each of the combinations of the first imaging pixel A and the second imaging pixel B identified by the relationship identification part 45. A horizontal component $i_C$ of the projection pixel is expressed as follows.

$$i_C = \frac{p I_{1AP}(i_A, j_A)}{2\pi} \quad [\text{Equation 2}]$$

Where p is the number of pixels corresponding to one cycle of repetition of stripes of the projection image. As shown in FIG. 11, the projection pixel $C_A$ which matches the horizontal component $i_C$ of the identified projection pixel exists on a third epipolar line $E_{CA}$ corresponding to the first imaging pixel A. The determination part 46 identifies a vertical component $j_{CA1}$ of the projection pixel $C_A$.

Next, the determination part 46 identifies a projection pixel having a projection coordinate ($i_C$, $j_{CB1}$) corresponding to the second imaging pixel B for each of the combinations of the first imaging pixel A and the second imaging pixel B. The horizontal component $i_C$ of the projection pixel is expressed as follows, and is the same as the projection pixel $C_A$.

$$i_C = \frac{p I_{1AP}(i_A, j_A)}{2\pi} = \frac{p I_{2AP}(i_B, j_B)}{2\pi} \quad [\text{Equation 3}]$$

As shown in FIG. 11, a projection pixel $C_B$, which matches the horizontal component is of the identified projection pixel, exists on the second epipolar line $E_{CB}$ associated with the second imaging pixel B. The determination part 46 identifies a vertical component $j_{CB1}$ of the projection pixel $C_B$. Assuming that the first imaging pixel A and the second imaging pixel B correspond to the same measurement point of the object to be measured, the projection pixel $C_A$ and the projection pixel $C_B$ approximately match with each other. Therefore, the determination part 46 can determine whether or not at least one of the first imaging pixel A or the second imaging pixel B is a defective pixel on the basis of a distance between the projection pixel $C_A$ and the projection pixel $C_B$.

An evaluation value $E_1$, indicating a distance between the projection pixels $C_A$ and $C_B$, is expressed as follows.

$$E_1 = \sqrt{(j_{CA1} - j_{CB1})^2} \quad [\text{Equation 4}]$$

The determination part 46 determines whether or not the evaluation value $E_1$ is larger than a first threshold value. The first threshold value is defined, for example, according to the measurement accuracy desired for the 3D geometry measurement apparatus 100. When the evaluation value $E_1$ is larger than the first threshold value, the determination part 46 determines that at least one of the first imaging pixel A or the second imaging pixel B is a defective pixel. When the evaluation value $E_1$ is equal to or less than the first threshold value, the determination part 46 determines that neither of the first imaging pixel A and the second imaging pixel B is a defective pixel. The determination part 46 obtains the evaluation value $E_1$ for each of the plurality of combinations of the first imaging pixel and the second imaging pixel identified by the relationship identification part 45, and determines whether or not the obtained evaluation value $E_1$ is larger than the first threshold value. The determination part 46 repeats the determination for the plurality of combinations.

With such configurations, the determination part 46 can determine whether at least one of the first imaging pixel A or the second imaging pixel B is the defective pixel affected by multiply reflected light or the like by determining whether the first imaging pixel A and the second imaging pixel B correspond to substantially the same projection pixel of the projection image for each of the combinations of the first imaging pixel and the second imaging pixel identified by the relationship identification part 45. Therefore, the determination part 46 can prevent the reduction of measurement accuracy of the geometry of the object to be measured due to multiply reflected light or the like.

The projection pixel $C_A$ shown in FIG. 11 needs to approximately match the projection pixel C located at the intersection of the second epipolar line $E_{CB}$ and the third epipolar line $E_{CA}$. For this reason, the determination part 46 may determine whether at least one of the first imaging pixel A or the second imaging pixel B is a defective pixel on the basis of a distance between the identified projection pixel $C_A$ and the projection pixel C. Similarly, the projection pixel $C_B$ needs to approximately match the projection pixel C. The determination part 46 may determine whether at least one of the first imaging pixel A or the second imaging pixel B is a defective pixel on the basis of a distance between the identified projection pixel $C_B$ and the projection pixel C.

[Measuring Geometry]

Using the principles of triangulation method, the geometry measurement part 47 measures the geometry of the object to be measured using at least one of (i) first imaging pixels corresponding to combinations of the first imaging pixel and the second imaging pixel that are determined to be not defective pixels and the projection coordinates corresponding to the first imaging pixels or (ii) second imaging pixels corresponding to the combination and the projection coordinates corresponding to the second imaging pixels. The geometry measurement part 47 acquires the combinations of the first imaging pixel and the second imaging pixel that are determined to be not defective pixels by the determination part 46 from among the combinations of the first imaging pixel and the first imaging pixel identified by the identification part 45.

Using the principles of the triangulation method for each of the acquired combinations of the first imaging pixel A and the second imaging pixel, the geometry measurement part 47 obtains the 3D position of a common measurement point corresponding to the first imaging pixel A and the second imaging pixel. The geometry measurement part 47 measures the 3D geometry of the object to be measured by repeating the same process for each of the plurality of combinations identified by the relationship identification part 45. Since the geometry measurement part 47 measures the 3D geometry by excluding defective pixels, the geometry measurement part 47 prevents the reduction of measurement accuracy of the 3D geometry caused by the effect of multiple reflections or the like.

In addition, the geometry measurement part 47 may obtain the 3D position of the measurement point, using the principles of a triangulation method, by using the first imaging pixels corresponding to the combinations of the first imaging pixel and the second imaging pixel that are determined to be not defective pixels by the determination part 46 and the projection coordinates corresponding to the first imaging pixels. The geometry measurement part 47 measures the 3D geometry of the object to be measured by repeating the same process for the plurality of first imaging pixels corresponding to the combinations of the first imaging pixel and the second imaging pixel that are determined to be no defective pixels by the identification part 46. Similarly, the geometry measurement part 47 may measure the 3D geometry of the object to be measured by using the second imaging pixels corresponding to the combinations of the first imaging pixel and the second imaging pixel that are determined to be not defective pixels by the identification part 46 and the projection coordinates corresponding to the second imaging pixels.

[Variations of Defective Pixel Determination]

The relationship identification part 45 is not limited to the example of identifying the combination of the first imaging pixel and the second imaging pixel corresponding to the same measurement point MP of the object to be measured. For example, the relationship identification part 45 may identify a combination of the first imaging pixel and the projection pixel which emitted the light received by the first imaging pixel.

The line identification part 44 identifies a fourth epipolar line $E_{BC}$ of the second captured image corresponding to the projection pixel C on the basis of the arrangement of the second imaging part 2 and the projection part 3, similar to FIGS. 8 and 9. The line identification part 44 reads arrangement information indicating the arrangement of the second imaging part 2 and the projection part 3 stored in the storage part 5 in advance, and identifies the fourth epipolar line $E_{BC}$ of the second captured image corresponding to the projection pixel C on the basis of the read arrangement information. The line identification part 44 stores the identified fourth epipolar line $E_{BC}$ in the storage part 5 in association with the projection pixel C. For example, the line identification part 44 associates coordinate values of the vertical components of respective second imaging pixels on the fourth epipolar line $E_{BC}$ with coordinate values of the horizontal components of the same second imaging pixels and stores them in the storage part 5.

The relationship identification part 45 identifies the combination of the first imaging pixel and the projection pixel which emitted the light received by the first imaging pixel. The relationship identification part 45 acquires the third epipolar line of the projection image associated with the first imaging pixel A from the storage part 5. When it is assumed that the absolute projection coordinate corresponding to the first imaging pixel A is $I_{1AP}(i_A, j_A)$, a projection pixel corresponding to the same absolute projection coordinate $I_{1AP}(i_A, j_A)$ as the first imaging pixel A exists on the third epipolar line. The projection pixel corresponds to the projection pixel that emits the light received by the first imaging pixel A. The relationship identification part 45 selects a projection pixel having the same absolute projection coordinate as the first imaging pixel from among the projection pixels located on the third epipolar line associated with the first imaging pixel A. The relationship identification part 45 identifies a combination of the first imaging pixel A and the selected projection pixel.

Figure 12:
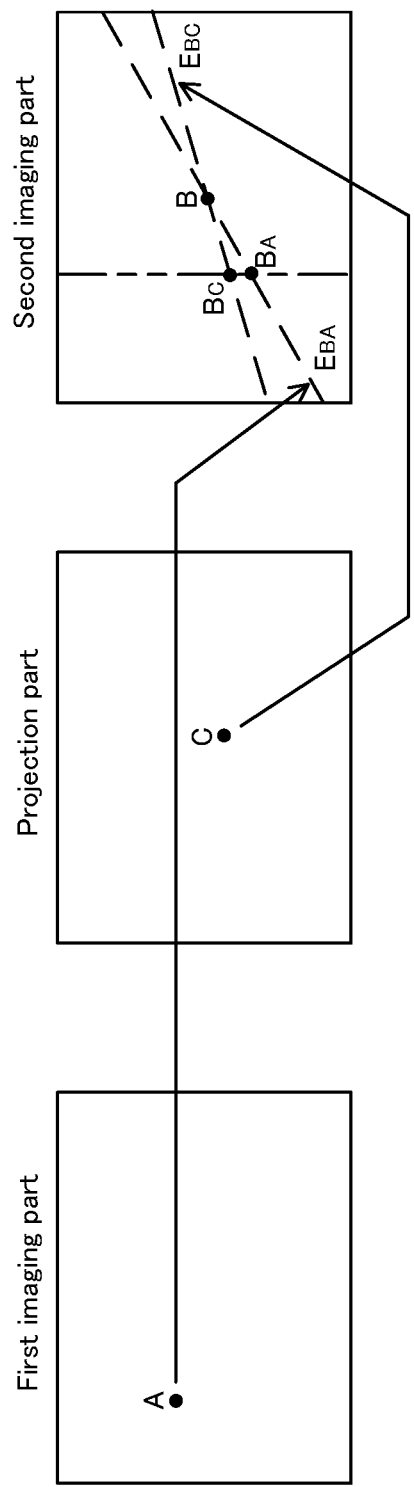
FIG. 12 shows a method of determining the defective pixel by the determination part.

When the relationship identification part 45 identifies the combination of the first imaging pixel A and the projection pixel C, the determination part 46 identifies the second imaging pixel corresponding to the same projection coordinate ($i_C$, $j_{CA1}$) as the first imaging pixel A for this combination. FIG. 12 shows a method of determining whether the imaging pixel is a defective pixel by the determination part 46. As shown in FIG. 12, a main second imaging pixel BA corresponding to the same projection coordinate as the first imaging pixel A exists on the first epipolar line $E_{BA}$ of the second captured image associated with the first imaging pixel A. The determination part 46 identifies the main second imaging pixel $B_A$.

Next, the determination part 46 identifies the second imaging pixel of the second captured image having the projection coordinate corresponding to the projection pixel C for the combination of the first imaging pixel A and the projection pixel C identified by the relationship identification part 45. On the fourth epipolar line $E_{BC}$ of the second captured image corresponding to the projection pixel C, a sub second imaging pixel $B_C$ corresponding to the same projection coordinate as the projection pixel C exists. The determination part 46 identifies the sub second imaging pixel $B_C$.

When light emitted from the projection pixel C is reflected off only once on the object to be measured and received on the first imaging pixel A and the second imaging pixel B, the main second imaging pixel $B_A$ and the sub second imaging pixel $B_C$ approximately match with each other. The determination part 46 identifies whether or not at least one of the first imaging pixel A, the main second imaging pixel $B_A$, or the sub second imaging pixel $B_C$ is a defective pixel on the basis of a distance between the main second imaging pixel $B_A$ and the sub second imaging pixel $B_C$. Therefore, the determination part 46 determines whether or not a distance between the main second imaging pixel $B_A$ and the sub second imaging pixel $B_C$ is greater than a second threshold value. The second threshold value is defined according to the measurement accuracy desired for the 3D geometry measurement apparatus 100. When the distance between the main second imaging pixel $B_A$ and the sub second imaging pixel $B_C$ is greater than the second threshold value, the determination part 46 determines that the first imaging pixel A is a defective pixel. When the distance between the main second imaging pixel $B_A$ and the sub second imaging pixel $B_C$ is equal to or less than the second threshold value, the determination part 46 determines that at least one of the first imaging pixel A, the main second imaging pixel $B_A$, or the sub second imaging pixel $B_C$ is a defective pixel. The geometry measurement part 47 measures the geometry of the object to be measured by using at least one of the first imaging pixel A, the main second imaging pixel $B_A$, or the sub second imaging pixel $B_C$ corresponding to the combination, for which the first imaging pixel A, the main second imaging pixel $B_A$, and the sub second imaging pixel $B_C$ that are determined to be not the defective pixel by the determination part 46.

[Determining a Defective Pixel by Vertical and Horizontal Stripes]

Figure 13A:
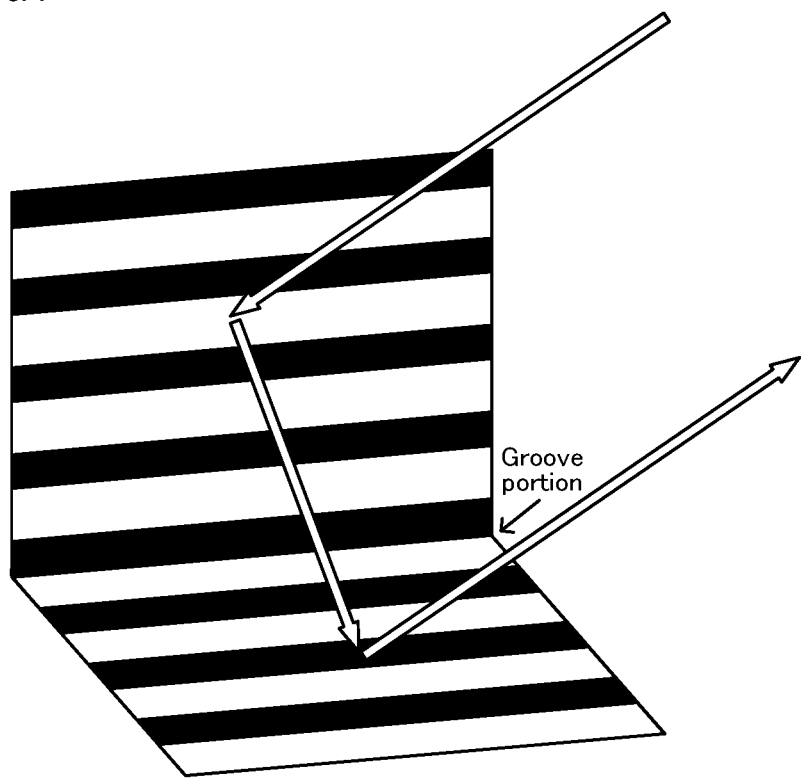
FIGS. 13A and 13B each show a relationship between (i) a direction, in which the stripes of the projection image extend, and (ii) multiply reflected light.
Figure 13B:
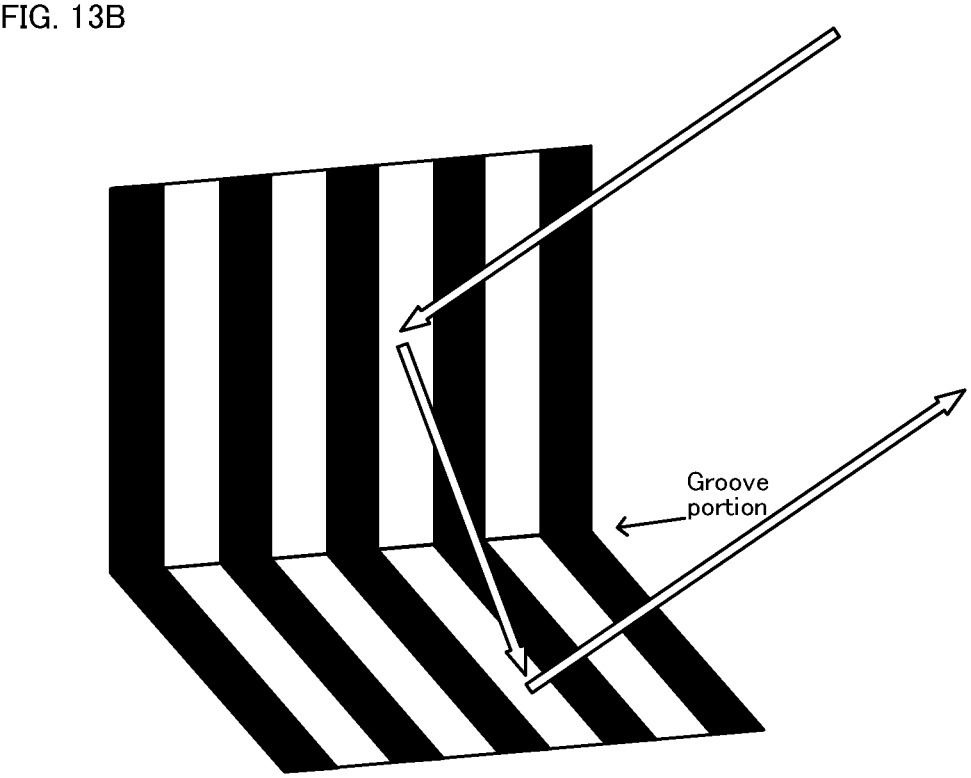

FIGS. 13A and 13B each show a relationship between (i) a direction in which the stripes of the projection image extend and (ii) multiply reflected light. Multiple reflections occur when the light emitted from the projection part 3 is repeatedly reflected multiple times around a portion where the object to be measured is bent. As shown in FIG. 13A, there is a case where light first reflected in the light projection region in the multiple reflections may enter the first imaging part 1 or the second imaging part 2 after being reflected in the non-projection region. In such a case, because luminance of the non-projection region appears to be higher in the captured image generated by the first imaging part 1 or the second imaging part 2 due to multiply reflected light, there is a possibility that the coordinate identification part 43 erroneously identifies a projection coordinate of the imaging pixel.

On the other hand, as shown in FIG. 13B, when (i) a direction in which the bent portion of the object to be measured extends and (ii) the direction in which the stripes extend are perpendicular to each other, the light first reflected in the light projection region in multiple reflections has a relatively high possibility to reflect in the light projection region at the next reflection. In the condition shown in FIG. 13B, the light emitted from the projection part 3 toward the light projection region is reflected again in another light projection region, and then enters the first imaging part 1 or the second imaging part 2. In this case, the influence of multiply reflected light on luminance of the light-projected and non-projected regions is relatively low. Therefore, when the projection control part 41 projects, onto the object to be measured, the plurality of projection images including the stripe patterns extending in different directions, the determination part 46 can determine whether the imaging pixel is a defective pixel by using the captured image being imaged while projecting images of a plurality of stripe patterns, in which stripes extend in different directions, thereby making it possible to further reduce the possibility that a defective pixel is overlooked.

When the projection control part 41 sequentially projects projection images including stripe patterns extending in the vertical direction and projection images including stripe patterns extending in the horizontal direction onto the object to be measured, the determination part 46 identifies a projection pixel having a projection coordinate corresponding to the first imaging pixel A by using (i) the projection coordinates based on of the stripe patterns extending in the vertical direction and (ii) the projection coordinates based on of the stripe patterns extending in the horizontal direction. More specifically, the determination part 46 acquires the combination of the first imaging pixel A and the second imaging pixel B identified by the relationship identification part 45. As described above, the combination identified by the relationship identification part 45 is the combination of (i) the first imaging pixel A and (ii) the second imaging pixel B($i_B$, $j_B$) positioned on the first epipolar line $E_{BA}$ corresponding to the first imaging pixel A in the second captured image (FIG. 8) and corresponding to the same absolute projection coordinate $I_{1AP}(i_A, j_A)$ as the first imaging pixel A($i_A$, $j_A$).

The determination part 46 identifies the projection pixel $C_A$ obtained from the absolute projection coordinate ($I_{1AP,1}(i_A, j_A)$, $I_{1AP,2}(i_A,j_A)$) corresponding to the first imaging pixel A identified by the first coordinate identification part 431 for each of the combinations of the first imaging pixel A and the second imaging pixel B identified by the relationship identification part 45. $I_{1AP,1}(i_A, j_A)$ represents the vertical component of the absolute projection coordinate, and $I_{1AP,2}(i_A, j_A)$ represents the longitudinal component of the absolute projection coordinate. Since the absolute projection coordinate corresponding to the first imaging pixel A has two direction components, i.e., the horizontal direction component and the vertical direction component, the determination part 46 can determine a projection pixel ($i_C$, $j_{CA2}$) having the same absolute projection coordinate as the first imaging pixel A as follows.

$$(i_C, j_{CA2}) = \left( \frac{p_1 I_{1AP,1}(i_A, j_A)}{2\pi}, \frac{p_2 I_{1AP,2}(i_A, j_A)}{2\pi} \right) \quad \text{[Equation 5]}$$

In this equation, $p_1$ is the number of pixels corresponding to one cycle of repetition of stripes extending in the vertical direction, and $p_2$ is the number of pixels corresponding to one cycle of repetition of stripes extending in the horizontal direction.

In each of the combinations of the first imaging pixel A and the second imaging pixel B identified by the relationship identification part 45, a value of a horizontal component $I_{1AP,1}(i_A, j_A)$ of the absolute projection coordinate corresponding to the first imaging pixel A and a value of a horizontal component $I_{2AP,1}(i_A, j_A)$ of the absolute projection coordinate corresponding to the second imaging pixel B are the same. The determination part 46 identifies the vertical component $I_{2AP,2}(i_B, j_B)$ of the absolute projection coordinate corresponding to the second imaging pixel B($i_B$, $j_B$) by identifying a phase in the horizontal gradation stripe patterns corresponding to the second imaging pixel B($i_B$, $j_B$) and a code value of the horizontal binary stripe patterns. The determination part 46 can determine a projection pixel ($i_C$, $j_{CB2}$) having the same absolute projection coordinate as that of the second imaging pixel B as follows.

$$(i_C, j_{CB2}) = \left( \frac{p_1 I_{2AP,1}(i_B, j_B)}{2\pi}, \frac{p_2 I_{2AP,2}(i_B, j_B)}{2\pi} \right) \quad \text{[Equation 6]}$$

When the first imaging pixel A and the second imaging pixel B correspond to the same measurement point of object to be measured, the projection pixel ($i_C$, $j_{CA2}$) and the projection pixel ($i_C$, $j_{CB2}$) need to approximately match with each other. That is, the determination part 46 can determine whether or not at least one of the first imaging pixel A or the second imaging pixel B is a defective pixel on the basis of a distance between the two projection pixels.

An evaluation value $E_2$ indicating a distance between the projection pixel ($i_C$, $j_{CA2}$) and the projection pixel ($i_C$, $j_{CB2}$) is expressed as follows.

$$E_2 = \sqrt{(j_{CA2} - j_{CB2})^2} \quad \text{[Equation 7]}$$

Substantially, the determination part 46 can calculate the evaluation value $E_2$ using $I_{1AP,2}(i_A, j_A)$ and $I_{2AP,2}(i_B, j_B)$. The determination part 46 determines whether or not the evaluation value $E_2$ is larger than a third threshold value. The third threshold value is defined according to the measurement accuracy desired for the 3D geometry measurement apparatus 100. When the evaluation value $E_2$ is larger than the third threshold value, the determination part 46 determines that at least one of the first imaging pixel A or the second imaging pixel B is a defective pixel. When the evaluation value $E_2$ is equal to or less than the third threshold value, the determination part 46 determines that neither of the first imaging pixel A and the second imaging pixel B is a defective pixel.

[Determining a Defective Pixel Using the Relative Projection Coordinates Vertically]

The determination part 46 may determine whether or not the imaging pixel is a defective pixel by using the absolute projection coordinates in the horizontal direction and the relative projection coordinates in the vertical direction. In each of the combinations of the first imaging pixel A and the second imaging pixel B identified by the relationship identification part 45, it is assumed that the projection coordinate of the first imaging pixel A is $(I_{1AP,1}(i_A, j_A), j_A)$. Here, $I_{1AP,1}(i_A, j_A)$ is the absolute projection coordinate in the horizontal direction, and $I_{1RP,2}(i_A, j_A)$ is the relative projection coordinate in the vertical direction.

Also, in each of the combinations of the first imaging pixel A and the second imaging pixel B identified by the relationship identification part 45, it is assumed that the projection coordinate of the second imaging pixel B is $(I_{2AP,1}(i_B, j_B), I_{2RP,2}(i_B, j_B))$. Here, $I_{2AP,1}(i_B, j_B)$ is the absolute projection coordinate in the horizontal direction, and $I_{2RP,2}(i_B, j_B)$ is the relative projection coordinate in the vertical direction. The horizontal component $i_C$ and a vertical component $j_{CA3}$ of the projection pixel $C_A$ having the same projection coordinate as that of the first imaging pixel A are expressed as follows.

$$(i_C, j_{CA3}) = \left( \frac{p_1 I_{1AP,1}(i_A, j_A)}{2\pi}, \frac{p_2 I_{1RP,2}(i_A, j_A)}{2\pi} + q_2 \right) \quad \text{[Equation 8]}$$

The horizontal component $i_C$ and the vertical component $j_{CB3}$ of the projection pixel $C_B$ having the same projection coordinate as that of the second imaging pixel B are expressed as follows. Again, the horizontal component $i_C$ of the projection pixel $C_B$ is the same as the horizontal component $i_C$ of the projection pixel $C_A$.

$$(i_C, j_{CB3}) = \left( \frac{p_1 I_{2AP,1}(i_B, j_B)}{2\pi}, \frac{p_2 I_{2RP,2}(i_B, j_B)}{2\pi} + q_2 \right) \quad \text{[Equation 9]}$$

In the equation, $q_2$ is an unknown number, but the first imaging pixel A and the second imaging pixel B are regarded to have the same $q_2$. An evaluation value $E_3$ indicating a distance between the projection pixel $(i_C, j_{CA3})$ and the projection pixel $(i_C, j_{CB3})$ is expressed as follows.

$$E_3 = \sqrt{(j_{CA3} - j_{CB3})^2} \quad \text{[Equation 10]}$$

The determination part 46 determines whether or not the evaluation value $E_3$ is larger than a fourth threshold value. The fourth threshold value is defined according to the measurement accuracy desired for the 3D geometry measurement apparatus 100. When the evaluation value $E_3$ is larger than the fourth threshold, the determination part 46 determines that at least one of the first imaging pixel A or the second imaging pixel B is a defective pixel. When the evaluation value $E_3$ is equal to or less than the fourth threshold value, the determination part 46 determines that neither of the first imaging pixel A and the second imaging pixel B is a defective pixel.

In the relative projection coordinate, as shown in FIG. 7, a range of values is limited to $2\pi$ and has periodicity. In such a case, the evaluation value, there is a possibility that an error in calculation of the evaluation value $E_3$ becomes large due to a slight difference of the corresponding pixel at a point where the value changes abruptly by $2\pi$. Therefore, the determination part 46 may also calculate the next evaluation values $E_{3A}$ and the evaluation value $E_{3B}$ in addition to the evaluation value $E_3$, and use the smallest value of these three evaluation values as a new evaluation value for the determination. The evaluation value $E_{3A}$ and the evaluation value $E_{3B}$ are expressed as follows.

$$E_{3A} = \sqrt{(j_{CA3} - j_{CB3} + p_2)^2} \quad \text{[Equation 11]}$$

$$E_{3B} = \sqrt{(j_{CA3} - j_{CB3} - p_2)^2} \quad \text{[Equation 12]}$$

[Determining a Defective Pixel by Stripes in Three or More Directions]

When the projection control part 41 projects, onto the object to be measured, a plurality of projection images including stripe patterns extending in three or more different directions, the determination part 46 identifies a projection pixel having the projection coordinate corresponding to the first imaging pixel A using the projection coordinate identified by the first coordinate identification part 431 for each projection image including stripe patterns extending in different directions.

For each of the combinations of the first imaging pixel A and the second imaging pixel B, the determination part 46 identifies a projection pixel having the same projection coordinate as the first imaging pixel A using the projection coordinates $(I_{1AP,1}(i_A, j_A), I_{1RP,2}(i_A, j_A), I_{1RP,3}(i_A, j_A), \ldots, I_{1RP,M}(i_A, j_A))$ corresponding to the first imaging pixel A identified by the first coordinate identification part 431. The first direction component $(I_{1AP,1}(i_A, j_A))$ of the projection coordinate corresponding to the first imaging pixel A is the absolute projection coordinate, and the second direction to the M-th direction components $I_{1RP,2}(i_A, j_A), I_{1RP,3}(i_A, j_A), \ldots, I_{1RP,M}(i_A, j_A)$ of the projection coordinate corresponding to the first imaging pixel A are the relative projection coordinates.

For each of the combinations of the first imaging pixel A and the second imaging pixel B, the determination part 46 identifies a projection pixel having the same projection coordinate as the second imaging pixel B using the projection coordinates $(I_{2AP,1}(i_B d, j_B), I_{2RP,2}(i_B, j_B), I_{2RP,3}(i_B, j_B), \ldots, I_{2RP,M}(i_B, j_B))$ corresponding to the second imaging pixel B identified by the second coordinate identification part 432. The first direction component $I_{2AP,1}(i_B, j_B)$ of the projection coordinate corresponding to the second imaging pixel B is the absolute projection coordinate, and the second direction to the M-th direction components $I_{2RP,2}(i_B, j_B), I_{2RP,3}(i_B, j_B), \ldots, I_{2RP,M}(i_B, j_B)$ of the projection coordinate corresponding to the second imaging pixel B are the relative projection coordinates.

The determination part 46 obtains an evaluation value $E_4$ for evaluating a deviation between the projection pixel having the projection coordinate corresponding to the first imaging pixel A and the projection pixel having the projection coordinate corresponding to the second imaging pixel B. The evaluation value $E_4$ is expressed as follows.

$$E_4 = \frac{1}{M-1} \sum_{m=2}^{M} \sqrt{\left( \frac{p_m I_{1RP,m}(i_A, j_A)}{2\pi} - \frac{p_m I_{2RP,m}(i_B, j_B)}{2\pi} \right)^2} \quad \text{[Equation 13]}$$

The determination part 46 determines whether or not the evaluation value $E_4$ is larger than a fifth threshold value. The fifth threshold value is defined according to the measurement accuracy desired for the 3D geometry measurement apparatus 100. When the evaluation value $E_4$ is larger than the fifth threshold value, the determination part 46 determines that at least one of the first imaging pixel A or the second imaging pixel B is a defective pixel. When the evaluation value $E_4$ is equal to or less than the fifth threshold value, the determination part 46 determines that neither of the first imaging pixel A and the second imaging pixel B is a defective pixel.

[Determining a Defective Pixel on the Basis of the Maximum Value of a Comparison Value]

In addition, the determination part 46 may determine a comparison value of the projection coordinate corresponding to the first imaging pixel A and the projection coordinate corresponding to the second imaging pixel B for each of a plurality of projection images, in which stripes extend in different directions, for each of the combinations of the first imaging pixel A and the second imaging pixel B identified by the relationship identification part 45. The comparison value is, for example, a difference value between the projection coordinate corresponding to the first imaging pixel A and the projection coordinate corresponding to the second imaging pixel B, but may be a ratio value between the projection coordinate corresponding to the first imaging pixel A and the projection coordinate corresponding to the second imaging pixel B.

The determination part 46 obtains the comparison value between (i) the respective direction components of the projection coordinates ($I_{1AP,1}(i_A, j_A)$, $I_{1RP,2}(i_A, j_A)$, $I_{1RP,3}(i_A, j_A)$ ..., $I_{1RP,M}(i_A, j_A)$) corresponding to the first imaging pixel A and (ii) the respective direction components of the projection coordinates ($I_{2AP,1}(i_B, j_B)$, $I_{2RP,2}(i_B, j_B)$, $I_{2RP,3}(i_B, j_B)$, ..., $I_{2RP,M}(i_B, j_B)$) corresponding to the second imaging pixel B.

The determination part 46 determines whether or not at least one of the first imaging pixel A or the second imaging pixel B is a defective pixel on the basis of the evaluation value based on the obtained comparison value. More specifically, the determination part 46 identifies a direction component having the maximum value among the obtained comparison values (($I_{1AP,1}(i_A, j_A)-I_{2AP,1}(i_B, j_B)$), ($I_{1RP,2}(i_A, j_A)-I_{2RP,2}(i_B, j_B)$), ($I_{1RP,3}(i_A, j_A)-I_{2RP,3}(i_B, j_B)$), . . . , ($I_{1RP,M}(i_A, j_A)-I_{2RP,M}(i_B, j_B)$)).

The determination part 46 determines whether or not this evaluation value $E_5$ is larger than a sixth threshold value, using the identified maximum value as the evaluation value $E_5$. The sixth threshold value is determined according to the measurement accuracy desired for the 3D geometry measurement apparatus 100. When the evaluation value $E_5$ is larger than the sixth threshold, the determination part 46 determines that at least one of the first imaging pixel A or the second imaging pixel B is a defective pixel.

When the identified evaluation value $E_5$ is equal to or less than the sixth threshold value, the determination part 46 determines that neither of the first imaging pixel A and the second imaging pixel B is a defective pixel. The determination part 46 determines whether or not at least one of the first imaging pixel A or the second imaging pixel B is a defective pixel by using the stripe patterns in which the defective pixel has the greatest influence. Therefore, the determination part 46 can accurately prevent oversight of the defective pixel.

As another method of comparison, the determination part 46 may determine, as a defective pixel, a first imaging pixel or the like, in which the evaluation value identified for another first imaging pixel becomes significantly large by using the standard deviation or the like for the comparison value. Further, the determination part 46 may calculate the above-mentioned average value, maximum value, standard deviation, and the like using weighting coefficients which define importance for each of the stripe directions. For example, the projection control part 41 may change the number of projection images projected or cycles of stripes for each stripe direction, and the determination part 46 may calculate the evaluation value by using different weighting coefficients according to the number of the projection images or the cycles of stripes.

[Measuring Process of the 3D Geometry Measurement Apparatus]

Figure 14:
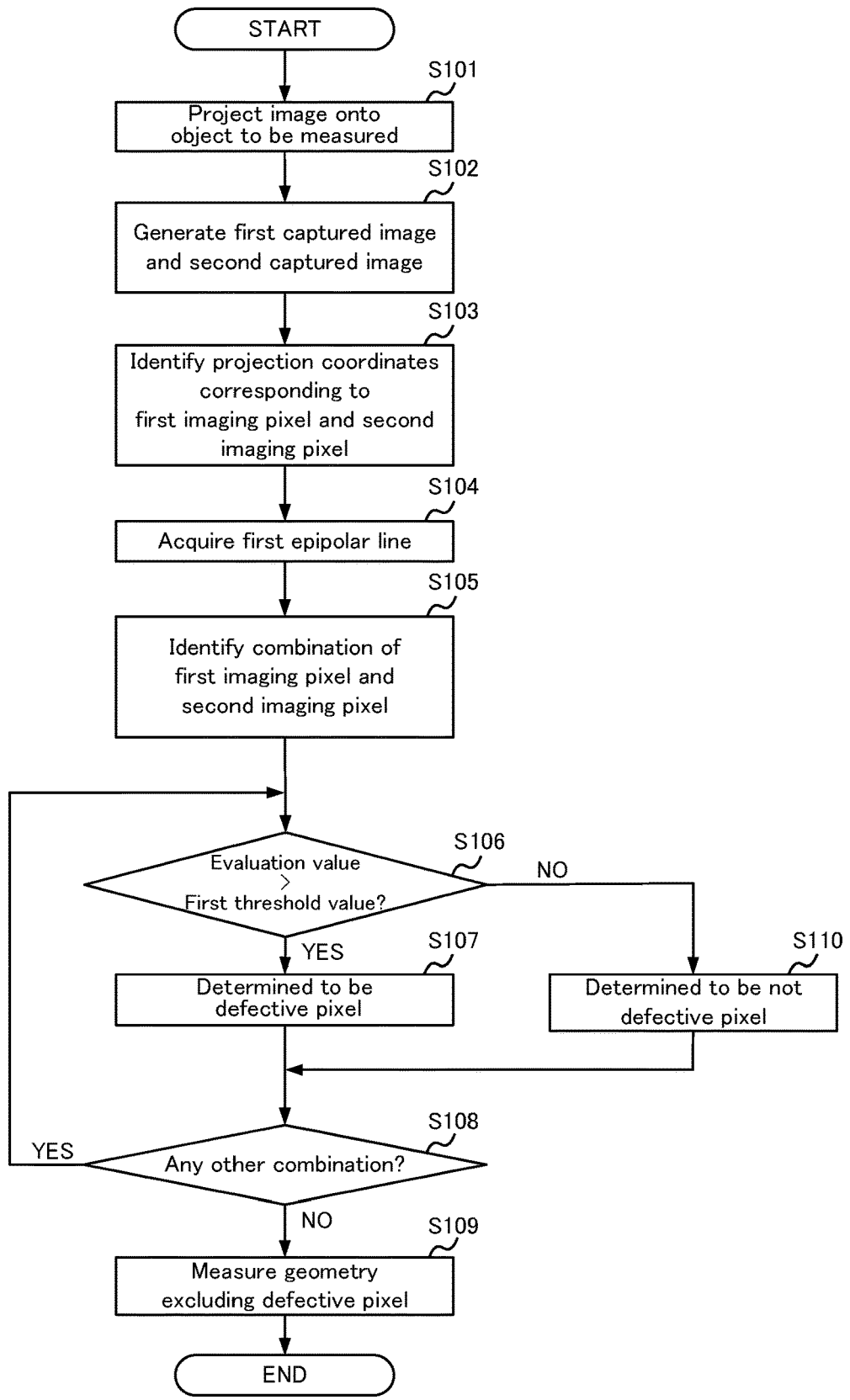
FIG. 14 is a flowchart showing a measuring process of a geometry of the object to be measured by the 3D geometry measurement apparatus.

FIG. 14 is a flowchart showing a measuring process of the geometry of the object to be measured by the 3D geometry measurement apparatus 100. This processing procedure starts when an operation accepting part (not shown) accepts a user's operation which instructs a start of measuring the geometry of the object to be measured.

First, the projection control part 41 projects, onto the object to be measured, the projection image including patterns for identifying the projection coordinate with the projection part 3 (S101). Next, the imaging control part 42 generates the first captured image, in which the projection image projected on the object to be measured is imaged by the first imaging part 1. Also, the imaging control part 42 generates the second captured image, in which the projection image projected on the object to be measured is imaged by the second imaging part 2 (S102).

The first coordinate identification part 431 identifies the projection coordinate corresponding to the first imaging pixel of the first captured image based on the patterns included in the first captured image. The second coordinate identification part 432 may identify the projection coordinate corresponding to the second imaging pixel of the second captured image on the basis of the patterns included in the second captured image (S103). The relationship identification part 45 acquires the first epipolar line of the second captured image associated with the first imaging pixel from the storage part 5 (S104). The relationship identification part 45 selects, as the first imaging pixel, the second imaging pixel corresponding to the same projection coordinate from among the second imaging pixels located on the acquired first epipolar line.

The relationship identification part 45 identifies, as the combination corresponding to the same measurement point, the combination of the first imaging pixel and the selected second imaging pixel (S105). Similarly, among a plurality of combinations of the plurality of first imaging pixels included in the first captured image and the plurality of second imaging pixels included in the second captured image, the relationship identification part 45 identifies a plurality of combinations corresponding to a common measurement point of the object to be measured.

The determination part 46 obtains a distance between (i) the projection pixel of the projection image having the projection coordinate corresponding to the first imaging pixel and (ii) the projection pixel of the projection image having the projection coordinate corresponding to the second imaging pixel for each of the combinations of the first imaging pixel and the second imaging pixel identified by the relationship identification part 45. The determination part 46 determines whether or not the evaluation value $E_1$ indicating the obtained distance is larger than the first threshold value (S106).

When the evaluation value $E_1$ is larger than the first threshold value (Yes in S106), the determination part 46 determines that at least one of the first imaging pixel or the second imaging pixel is a defective pixel for each of the combinations identified by the relationship identification part 45 (S107). The geometry measurement part 47 determines whether there is another combination identified by the relationship identification part 45 (S108).

When it is determined that there is no other combination identified by the relationship identification part 45 (NO in S108), the geometry measurement part 47 measures the 3D geometry of the object to be measured using at least one of pixels corresponding to the combination of the first imaging pixel and the second imaging pixel that are determined to be not the defective pixel by the determination part 46 (S109), and finishes the processing.

When the evaluation value $E_1$ is equal to or less than the first threshold value in the determination of the step S106 (NO in S106), the determination part 46 determines that neither of the first imaging pixel and the second imaging pixel is a defective pixel (S110), and proceeds to the processing of the step S108. In a case where it is determined in the determination of the step S108 that there is another combination identified by the relationship identification part 45 (YES in S108), the geometry measurement part 47 performs the processing of the step S106.

Effects of the Present Embodiment

The determination part 46 determines whether or not the first imaging pixel A and the second imaging pixel B correspond to substantially the same projection pixel of the projection image for each of the combinations of the first imaging pixel and the second imaging pixel identified by the relationship identification part 45, thereby determining whether or not at least one of the first imaging pixel A or the second imaging pixel B is the defective pixel affected by multiply reflected light or the like. Therefore, the determination part 46 can prevent the reduction of measurement accuracy of the geometry of the object to be measured by the geometry measurement part 47 due to multiply reflected light or the like.

Second Embodiment

[Readjusting a Combination Using Multi-Directional Stripes]

In the first embodiment, the example of the relationship identification part 45 identifies the combination of the first imaging pixel and the second imaging pixel corresponding to the same measurement point of the object to be measured by using the projection coordinates on the basis of the stripe patterns extending in a single direction was explained. In this case, there was a case where the first imaging pixel in the first captured image and the second imaging pixel in the second captured image do not correspond to the same position of the object to be measured. Therefore, a relationship identification part 45 according to the second embodiment uses projection coordinates on the basis of stripe patterns extending in a plurality of different directions to identify the combination of the first imaging pixel and the second imaging pixel, thereby improving accuracy of identifying the combination corresponding to the same measurement point of the object to be measured. This enables the geometry measurement part 47 to improve the measurement accuracy of the 3D geometry of the object to be measured.

Specifically, in the second embodiment, the relationship identification part 45 readjusts the combination of the first imaging pixel and the second imaging pixel corresponding to the same measurement point of the object to be measured using the projection coordinates on the basis of the stripe patterns extending in the plurality of different directions.

Figure 15:
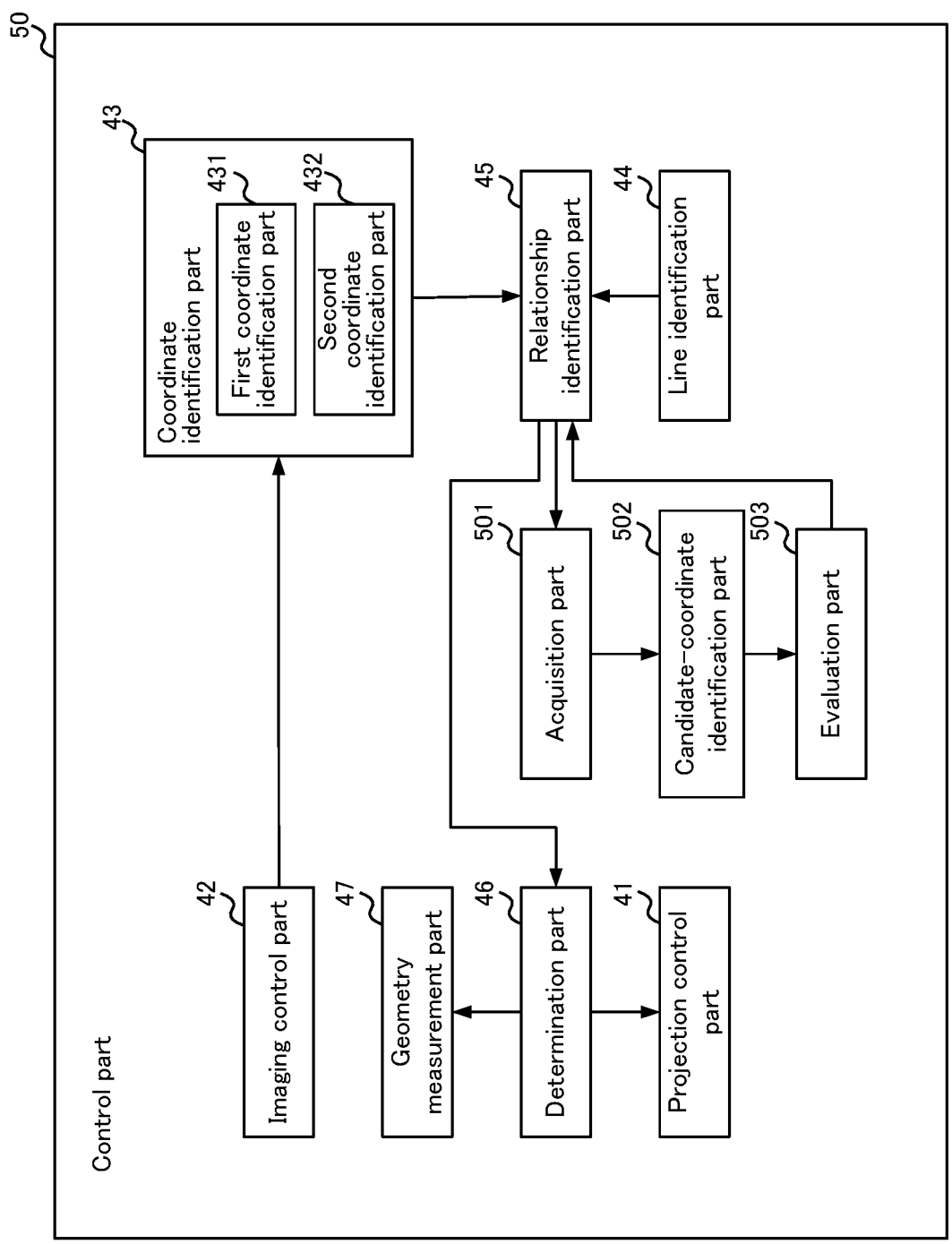
FIG. 15 shows a configuration of a control part provided in a 3D geometry measurement apparatus of the second embodiment.

FIG. 15 shows a configuration of a control part 50 provided in a 3D geometry measurement apparatus of the second embodiment. In addition to the blocks of the control part 4 shown in FIG. 1, the control part 50 further includes an acquisition part 501, a candidate-coordinate identification part 502, and an evaluation part 503. Regarding the blocks that are the same as those in the control part 4 in FIG. 1, the same reference numerals are used and the associated description is omitted.

The acquisition part 501 first acquires the combination of the first imaging pixel and the second imaging pixel identified by the relationship identification part 45 using the projection coordinates based on the stripe patterns extending in the single direction. The acquisition part 501 acquires, as corresponding candidate pixels, a plurality of second imaging pixels within a predetermined range from the acquired combinations of the second imaging pixels. The predetermined range is, for example, a range adjoining the second imaging pixel in the combinations acquired by the acquisition part 501. The acquisition part 501 may acquire a corresponding candidate pixel in a unit smaller than a pixel. For example, when a pixel is defined as a unit of one pixel, the acquisition part 501 acquires a plurality of corresponding candidate pixels in units of sub-pixels. The sub pixels are image elements whose sizes are smaller than pixels.

When the projection control part 41 projects a plurality of projection images, in which stripes extend in different directions, the candidate-coordinate identification part 502 identifies the projection coordinate corresponding to the corresponding candidate pixel for each of the projection images, in which stripes extend in different directions. The candidate-coordinate identification part 502 identifies projection coordinates of the plurality of corresponding candidate coordinates. For example, the candidate-coordinate identification part 502 identifies the projection coordinates of the plurality of corresponding candidate coordinates in sub-pixel units.

Figure 16:
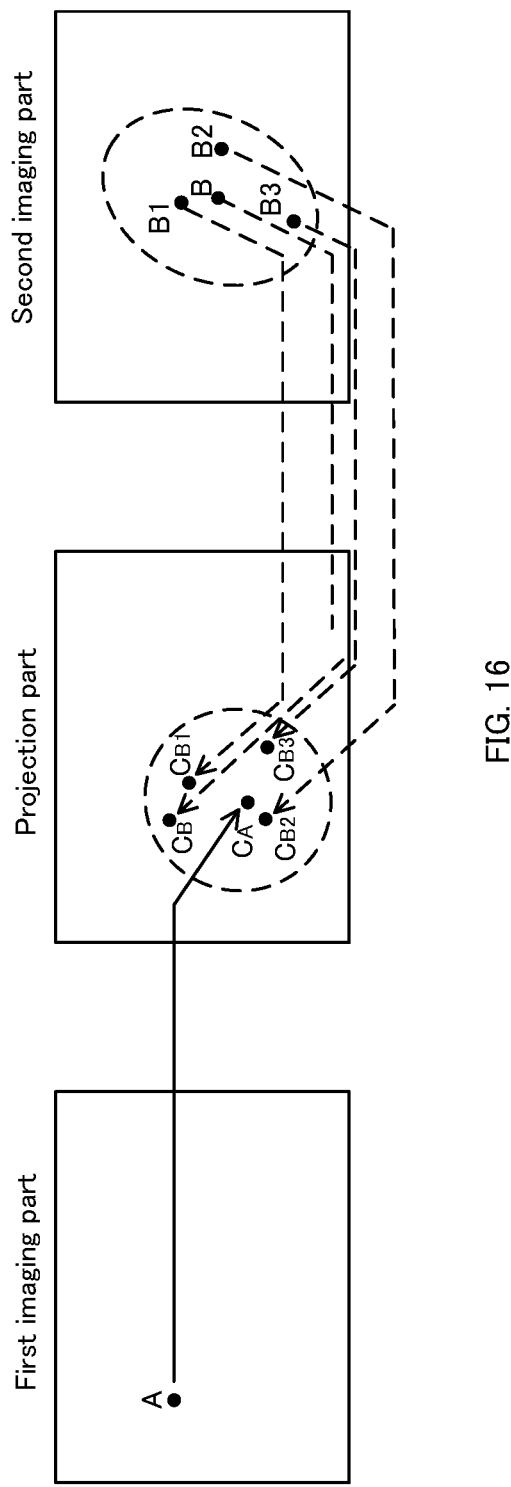
FIG. 16 shows an evaluation method of the corresponding candidate pixels by an evaluation part.

The evaluation part 503 obtains, for each projection image in which stripes extend in different directions, a comparison value between the projection coordinate corresponding to the first imaging pixel and the projection coordinate corresponding to the corresponding candidate pixel, and obtains an evaluation value on the basis of the obtained comparison value for each corresponding candidate pixel. The comparison value is, for example, a difference value between the projection coordinate corresponding to the first imaging pixel and the projection coordinate corresponding to the corresponding candidate pixel, but may be a value for the ratio of the projection coordinate corresponding to the first imaging pixel to the projection coordinate corresponding to the corresponding candidate pixel. FIG. 16 shows an evaluation method of the corresponding candidate pixels using an evaluation part 503.

First, similarly to FIG. 11, the evaluation part 503 identifies a projection pixel $C_A$ having the same projection coordinates $(I_{1AP,1}(i_A, j_A), I_{1RP,2}(i_A, j_A), I_{1RP,3}(i_A, j_A), \ldots, I_{1RP,M}(i_A, j_A))$ as that of the first imaging pixel A in the combination of the first imaging pixel A and the second imaging pixel B identified by the relationship identification part 45. The evaluation part 503 identifies a projection pixel $C_{B1}$ having the same projection coordinates $(I_{2AP,1}(i_{B1}, j_{B1}), I_{2RP,2}(i_{B1}, j_{B1}), I_{2RP,3}(i_{B1}, j_{B1}), I_{2RP,M}(i_{B1}, j_{B1}))$ as that of a corresponding candidate pixel $B_1$. The evaluation part 503 calculates the following evaluation value $E_6$ on the basis of the comparison value between the projection coordinates of the projection pixel $C_A$ and the projection coordinates of the projection pixel $C_{B1}$ in the respective directional components.

$$E_6 = \frac{1}{M}\left(\frac{p_1}{2\pi}\sqrt{(l_{1AP,1}(i_A, j_A) - l_{2AP,1}(i_{B1}, j_{B1}))^2} + \sum_{m=2}^{M} \frac{p_m}{2\pi}\sqrt{(l_{1RP,m}(i_A, j_A) - l_{2RP,m}(i_{B1}, j_{B1}))^2}\right)$$ [Equation 14]

Similarly, the evaluation part 503 identifies the projection pixel $C_{B2}$ having the same projection coordinates as that of the corresponding candidate pixel $B_2$, and calculates the evaluation value $E_6$ on the basis of the comparison value between the projection coordinates of the projection pixel $C_A$ and the projection coordinates of the projection pixel $C_{B1}$ in the respective directional components. Also, the evaluation part 503 similarly calculates the evaluation value $E_6$ for the projection image $C_B$ having the same projection coordinates as that of the second imaging pixel B in the combination of the first imaging pixel A and the second imaging pixel B identified by the relationship identification part 45.

The relationship identification part 45 identifies, as a new combination, one of the plurality of correspondence candidate pixels and the first imaging pixel A among the combinations acquired by the acquisition part 501, on the basis of the evaluation values $E_6$ obtained by the evaluation part 503. For example, the relationship identification part 45 selects a corresponding candidate pixel having the smallest evaluation value $E_6$ calculated by the evaluation part 503, and identifies a combination of the first imaging pixel A and the selected corresponding candidate pixel as a new combination.

According to the present embodiment, the relationship identification part 45 can more accurately identify the combination of the first imaging pixel and the second imaging pixel corresponding to the same measurement point of the object to be measured by using the projection coordinates on the basis of the stripe patterns extending in the plurality of directions. For this reason, the accuracy of determining whether or not the imaging pixel is a defective pixel by the determination part 46 also improves, and therefore the measurement accuracy of the geometry of the object to be measured by the geometry measurement part 47 improves.

[Re-Measurement Process Using a Projection Image Excluding Defective Pixels]

Since a defective pixel often occurs due to multiply reflected light, the influence of multiply reflected light can be prevented by projecting a projection image excluding a projection pixel of the projection coordinate corresponding to the imaging pixel determined to be the defective pixel. Therefore, when the determination part 46 determines that at least one of the first imaging pixel or the second imaging pixel is the defective pixel, the projection control part 41 may project, onto the object to be measured, a projection image (hereinafter referred to as a first selected projection image) excluding all of the projection pixels having projection coordinates corresponding to the first imaging pixel or the second imaging pixel, which corresponds to the combination of the first imaging pixel and the second imaging pixel that are determined not to be the defective pixels by the determination part 46 from among a plurality of projection pixels included in the projection image.

Since the defective pixel is likely to be affected by multiply reflected light, the projection control part 41 can prevent the influence of multiply reflected light by projecting the first selected projection image excluding the defective pixels. Therefore, the first coordinate identification part 431 can accurately identify the projection coordinate corresponding to the first imaging pixel. Similarly, the second coordinate identification part 432 can accurately identify the projection coordinate corresponding to the second imaging pixel.

[Re-Measurement Process Using a Projection Image with Defective Pixels Only]

It can be considered that a defective pixel due to multiple reflections occurs by projecting the projection images including a large number of pixels onto the object to be measured at one time. Therefore, when the determination part 46 determines that at least one of the first imaging pixel or the second imaging pixel is a defective pixel, the projection control part 41 may perform the measurement again by projecting, onto the object to be measured, a projection image (hereinafter referred to as a second selected projection image) only including the projection pixels having the projection coordinates corresponding to the first imaging pixel or the second imaging pixel corresponding to the combination, which the determination part 46 has determined to be the defective pixel, from among the plurality of projection pixels included in the projection image in order to reduce the number of projection pixels to be projected at one time.

The projection control part 41 decreases the number of pixels that are simultaneously projected by projecting the second selected projection image, compared to the case when all projection images are projected. The first coordinate identification part 431 and the second coordinate identification part 432 can increase the number of imaging pixels used for measuring the 3D geometry of the object to be measured by again identifying the projection coordinate corresponding to the first imaging pixel or the second imaging pixel which the determination part 46 has determined to be the defective pixel.

[Projecting Several Projection Images Including Stripe Patterns with Different Cycles]

Also, the projection control part 41 may sequentially project a plurality of projection images including stripe patterns, whose cycles of stripes are different from each other, having sinusoidal luminance distributions. For example, the projection control part 41 may project the projection image including the stripe patterns extending in the first direction onto the object to be measured, and then additionally project the projection image with the stripe patterns extending in the first direction and having different cycles onto the object to be measured.

Also, the projection control part 41 may project the projection image including the stripe patterns extending in the second direction onto the object to be measured, and then may additionally project the projection image including stripe patterns extending in the second direction and having different cycles onto the object to be measured. If light reflected only once by the measurement surface of the object to be measured and received on the imaging pixel is regarded as direct reflection light, when the projection image including the stripe patterns with the different cycles is projected, the phase of multiply reflected light overlapping the direct reflection light changes. For this reason, the determination part 46 can detect the pixel affected by the multiply reflected light more accurately.

Also, in the first and second embodiments, examples of the cases where the projection control part 41 projects (i) the plurality of projection images including binary stripe patterns having different cycles and (ii) the projection image including stripe patterns having sinusoidal luminance distributions were explained. However, the present invention is not limited to these cases. For example, the projection control part 41 may project, onto the object to be measured, the plurality of projection images including stripe patterns having sinusoidal luminance distributions and different cycles instead of the plurality of projection images including the binary stripe patterns.

[Detecting System Malfunctions]

The determination part 46 is not limited to an example of the case where it is determined whether or not the imaging pixel is the defective pixel, and may determine whether or not defects have occurred in any of the arrangements of the first imaging part 1, the second imaging part 2, and the projection part 3. The determination part 46 determines whether or not defects have occurred in any of the arrangement of the first imaging part 1, the second imaging part 2, and the projection part 3 by using a statistical quantity of a plurality of evaluation values $E_1$ obtained for each of the plurality of combinations of the first imaging pixel and the second imaging pixel identified by the relationship identification part 45.

The determination part 46 determines that the defects occurred in any of the arrangements of the first imaging part 1, the second imaging part 2, and the projection part 3 when the statistical quantity of the obtained plurality of evaluation values $E_1$ exceeds the reference value. The defects in the arrangement mean that, for example, an arrangement of any of the first imaging part 1, the second imaging part 2, and the projection part 3 has deviated from the arrangement stored in the storage part 5 in advance.

The statistical quantity is, for example, an average value of the plurality of evaluation values $E_1$ obtained by the determination part 46 for each of the plurality of combinations of the first imaging pixel and the second captured image. The reference value is a value determined as a value indicating that the accuracy of identifying the combination of the first imaging pixel and the second imaging pixel identified by the relationship identification part 45 is reduced due to a factor other than multiply reflected light. With such configurations, the determination part 46 can determine whether or not defects have occurred in any of the arrangements of the first imaging part 1, the second imaging part 2, and the projection part 3.

In the first embodiment and the second embodiment, examples of the cases where the 3D geometry measurement apparatus 100 includes the first imaging part 1, the second imaging part 2, and the projection part 3 have been explained. However, the present invention is not limited to these cases. The 3D geometry measurement apparatus 100 may include three or more imaging parts and two or more projection parts, and the series of processes described in the first embodiment and the second embodiment may be repeated for any combinations of these imaging parts and projection parts.

The present invention has been described above on the basis of the exemplary embodiments. The technical scope of the present invention is not limited to the scope explained in the above embodiments, and it is obvious to those skilled in the art that various changes and modifications within the scope of the invention may be made. An aspect to which such changes and modifications are added can be included in the technical scope of the present invention is obvious from the description of the claims.

What is claimed is:

1. A three-dimensional geometry measurement apparatus comprising:
   a projection part that projects, onto an object to be measured, a projection image including patterns for identifying a projection coordinate;
   a first imaging part that generates a first captured image by imaging the projection image projected onto the object to be measured;
   a second imaging part that generates a second captured image by imaging the projection image projected onto the object to be measured;
   a first coordinate identification part that identifies the projection coordinate corresponding to a first imaging pixel of the first captured image on the basis of the patterns included in the first captured image;
   a second coordinate identification part that identifies the projection coordinate corresponding to a second imaging pixel of the second captured image on the basis of the patterns included in the second captured image;
   a line identification part that identifies a first epipolar line of the second captured image corresponding to the first imaging pixel on the basis of an arrangement of the first imaging part and the second imaging part;
   a relationship identification part that identifies a combination of the first imaging pixel and the second imaging pixel corresponding to the same projection coordinate as the projection coordinate corresponding to the first imaging pixel and located on the first epipolar line of the second captured image corresponding to the first imaging pixel;
   a determination part that determines, for each combination of the first imaging pixel and the second imaging pixel, whether or not at least one of the first imaging pixel or the second imaging pixel is a defective pixel on the basis of a distance between a projection pixel of the projection image having the projection coordinate corresponding to the first imaging pixel and a projection pixel of the projection image having the projection coordinate corresponding to the second imaging pixel; and
   a geometry measurement part that measures a geometry of the object to be measured using at least one of the first imaging pixel or the second imaging pixel corresponding to the combination, for which the first imaging pixel and the second imaging pixel that are determined to be not the defective pixel.

2. The three-dimensional geometry measurement apparatus according to claim 1, wherein
   the projection part projects a plurality of the projection images that each include the patterns, in which stripes extend in the same direction onto the object to be measured,
   the line identification part identifies a second epipolar line of the projection image corresponding to the second imaging pixel on the basis of an arrangement of the second imaging part and the projection part, and identifies a third epipolar line of the projection image corresponding to the first imaging pixel on the basis of an arrangement of the first imaging part and the projection part, and
   the determination part determines, for each combination of the first imaging pixel and the second imaging pixel, whether or not at least one of the first imaging pixel or the second imaging pixel is a defective pixel on the basis of a distance between (i) the projection pixel having the projection coordinate corresponding to the first imaging pixel and located on the third epipolar line of the projection image corresponding to the first imaging pixel and (ii) the projection pixel having the projection coordinate corresponding to the second imaging pixel and located on the second epipolar line of the projection image corresponding to the second imaging pixel and located on the second epipolar line.

3. The three-dimensional geometry measurement apparatus according to claim 1, wherein the projection part projects, onto the object to be measured, a plurality of the projection images including the patterns, in which stripes extend in the same direction, the line identification part identifies a second epipolar line of the projection image corresponding to the second imaging pixel on the basis of the arrangement of the second imaging part and the projection part, and identifies a third epipolar line of the projection image corresponding to the first imaging pixel on the basis of the arrangement of the first imaging part and the projection part, and the determination part determines, for each combination of the first imaging pixel and the second imaging pixel, whether or not at least one of the first imaging pixel or the second imaging pixel is a defective pixel on the basis of a distance between (i) the projection pixel having the projection coordinate corresponding to the first imaging pixel and located on the third epipolar line of the projection image corresponding to the first imaging pixel and the projection pixel located at the intersection of the second epipolar line and the third epipolar line.

4. The three-dimensional geometry measurement apparatus according to claim 1, wherein the projection part projects, onto the object to be measured, a plurality of projection images including the patterns of stripes, whose directions extending in the projection images are different for each projection image.

5. The three-dimensional geometry measurement apparatus according to claim 4, wherein the first coordinate identification part identifies the projection coordinate corresponding to the first imaging pixel for each of the plurality of projection images having stripes that extend in different directions for each projection image, the second coordinate identification part identifies the projection coordinate corresponding to the second imaging pixel for each of the plurality of projection images having stripes that extend in different directions for each projection image, the determination part obtains a comparison value between the projection coordinate corresponding to the first imaging pixel and the projection coordinate corresponding to the second imaging pixel for each of the plurality of projection images, whose stripes extend in different directions for each projection image, in the combination of the first imaging pixel and the second imaging pixel identified by the relationship identification part, and determines whether at least one of the first imaging pixel or the second imaging pixel is a defective pixel on the basis of an evaluation value based on the obtained comparison value.

6. The three-dimensional geometry measurement apparatus according to claim 4, wherein the first coordinate identification part identifies the projection coordinate corresponding to the first imaging pixel for each of the plurality of projection images, whose stripes extend in different directions for each projection image, and the three-dimensional geometry measurement apparatus further comprises:

an acquisition part that acquires the combination of the first imaging pixel and the second imaging pixel identified by the relationship identification part, and acquires, as corresponding candidate pixels, a plurality of the second imaging pixels within a predetermined range from the acquired combination of the second imaging pixel;

a candidate coordinate identification part that identifies the projection coordinate corresponding to the plurality of corresponding candidate pixels for each of the projection images having stripes that extend in different directions for each projection image; and an evaluation part that obtains a comparison value between the projection coordinate corresponding to the first imaging pixel and the projection coordinate corresponding to the corresponding candidate pixel for each of the projection images having stripes that extend in different directions for each projection image, and obtains an evaluation value on the basis of a plurality of the comparison values obtained for each projection image for each of the corresponding candidate pixels, wherein the relationship identification part identifies, as a new combination, one of the correspondence candidate pixels and the first imaging pixel among the combination acquired by the acquisition part on the basis of the evaluation values obtained by the evaluation part.

7. The three-dimensional geometry measurement apparatus according to claim 1, wherein the relationship identification part identifies a plurality of the combinations of a plurality of first imaging pixels included in the first captured image and a plurality of second imaging pixels included in the second captured image, the determination part obtains an evaluation value indicating a distance between (i) the projection pixel of the projection image having the projection coordinate corresponding to the first imaging pixel and (ii) the projection pixel of the projection image having the projection coordinate corresponding to the second imaging pixel for each of the combinations of the first imaging pixels and the second imaging pixels identified by the relationship identification part, determines the evaluation value for each of the combinations, and determines that defects occurred in any of arrangements of the first imaging part, the second imaging part, and the projection part when an statistical quantity of the obtained plurality of evaluation values exceeds a reference value.

8. The three-dimensional geometry measurement apparatus according to claim 1, wherein the projection part projects, onto the object to be measured, the projection image including binary stripe patterns and the projection image including the patterns in which stripes have sinusoidal luminance distributions.

9. The three-dimensional geometry measurement apparatus according to claim 1, wherein the projection part sequentially projects a plurality of the projection images including the patterns of stripes, whose cycles of stripes are different from each other, and having sinusoidal luminance distributions.

10. The three-dimensional geometry measurement apparatus according to claim 1, wherein
the projection part again projects, onto the object to be measured, a projection image excluding all of the projection pixels having the projection coordinate corresponding to any of the first imaging pixel or the second imaging pixel determined to be a defective pixel by the determination part from among the plurality of pixels included in the projection image.

11. The three-dimensional geometry measurement apparatus according to claim 1, wherein
the projection part again projects, onto the object to be measured, a projection image only including the projection pixels having the projection coordinate corresponding to any of the first imaging pixel or the second imaging pixel determined to be a defective pixel from among the plurality of projection pixels included in the projection image.

12. A three-dimensional geometry measurement method comprising:
projecting, onto an object to be measured, a projection image including patterns for identifying a projection coordinate;
generating a first captured image by imaging the projection image projected onto the object to be measured with a first imaging part;
generating a second captured image by imaging the projection image projected onto the object to be measured with a second imaging part;
identifying the projection coordinate corresponding to a first imaging pixel of the first captured image on the basis of the patterns included in the first captured image;
identifying the projection coordinate corresponding to a second imaging pixel of the second captured image on the basis of the patterns included in the second captured image;
identifying an epipolar line of the second captured image corresponding to the first imaging pixel on the basis of an arrangement of the first imaging part and the second imaging part;
identifying a combination of the first imaging pixel and the second imaging pixel corresponding to the same projection coordinate as the projection coordinate corresponding to the first imaging pixel and located on the epipolar line of the second captured image corresponding to the first imaging pixel;
determining, for each combination of the first imaging pixel and the second imaging pixel, whether or not at least one of the first imaging pixel or the second imaging pixel is a defective pixel, on the basis of a distance between (i) a projection pixel of the projection image having the projection coordinate corresponding to the first imaging pixel and (ii) a projection pixel of the projection image having the projection coordinate corresponding to the second imaging pixel; and
measuring a geometry of the object to be measured using at least one of the first imaging pixel or the second imaging pixel corresponding to the combination for which the first imaging pixel and the second imaging pixel that are determined to be not the defective pixel.

* * * * *